US012617645B2

(12) United States Patent
Martinotti

(10) Patent No.: US 12,617,645 B2
(45) Date of Patent: May 5, 2026

(54) METHOD AND SYSTEM FOR STORING FLEXIBLE DOCUMENTS

(71) Applicant: ARCA TECHNOLOGIES S.R.L., Bollengo (IT)

(72) Inventor: Paolo Martinotti, Bollengo (IT)

(73) Assignee: SESAMI TECHNOLOGIES S.R.L., Bollengo (IT)

( * ) Notice: Subject to any disclaimer, the term of this patent is extended or adjusted under 35 U.S.C. 154(b) by 0 days.

(21) Appl. No.: 18/403,830

(22) Filed: Jan. 4, 2024

(65) Prior Publication Data

US 2024/0253930 A1 Aug. 1, 2024

(30) Foreign Application Priority Data

Jan. 31, 2023 (IT) ........................ 102023000001515

(51) Int. Cl.
*B65H 29/00* (2006.01)
*B65H 29/16* (2006.01)
(Continued)

(52) U.S. Cl.
CPC ........... *B65H 29/006* (2013.01); *B65H 29/16* (2013.01); *B65H 43/08* (2013.01); *G07D 11/12* (2019.01); *G07D 11/16* (2019.01); *G07D 11/22* (2019.01); *B65H 2301/4191* (2013.01); *B65H 2301/4452* (2013.01); *B65H 2511/10* (2013.01); *B65H 2511/22* (2013.01); *B65H 2511/24* (2013.01);
(Continued)

(58) Field of Classification Search
CPC .......... B65H 29/006; B65H 2301/4452; B65H 2301/44522; B65H 2301/4453; B65H 2301/4191; B65H 2301/41912
See application file for complete search history.

(56) References Cited

U.S. PATENT DOCUMENTS 10,464,764 B2 * 11/2019 Yokawa .................. B65H 5/00

FOREIGN PATENT DOCUMENTS

| | | |
|---|---|---|
| EP | 2104638 | 9/2009 |
| EP | 3349193 | 7/2018 |

OTHER PUBLICATIONS

Italian Patent and Trademark Office, Search Report for IT patent Application No. 102023000001515, Sep. 15, 2023.

* cited by examiner

*Primary Examiner* — Jeremy R Severson
(74) *Attorney, Agent, or Firm* — Williams Mullen; R. Brian Drozd

(57) ABSTRACT

A method for storing a series of flexible documents include: sensing a first flexible document by a sensor; thereafter, sensing a next flexible document transported toward a module and determining position information for the next flexible document; based on dimension information and a last obtained position information on the first flexible document and the next flexible document, determining a minimum distance along an axis parallel to a longitudinal axis, that would be left on transport tape, between the rear side of flexible document and the front side of the next flexible document; comparing the determined minimum distance with a predetermined minimum distance; and in response to the determined minimum distance being different from the predetermined minimum distance, adjusting the transport tape's speed between a time when the first flexible document is engaged with transport tape and when the next flexible document is engaged with transport tape inside the module.

14 Claims, 16 Drawing Sheets

(51) Int. Cl.

| | |
|---|---|
| ***B65H 43/08*** | (2006.01) |
| ***G07D 11/12*** | (2019.01) |
| ***G07D 11/16*** | (2019.01) |
| ***G07D 11/22*** | (2019.01) |

(52) U.S. Cl.

CPC .... *B65H 2513/10* (2013.01); *B65H 2557/242* (2013.01); *B65H 2701/1912* (2013.01); *G07D 2211/00* (2013.01)

$$\Delta T_{dec} = \frac{a * Rcc - \sqrt{(a * Rcc)^2 + 4 * a * (d_d - d_{pred})}}{2 * a}$$

$$V_t = V - a * \Delta T_{dec}$$

$$\Delta T_{acc} = \frac{a * Rcc - \sqrt{(a * Rcc)^2 - 4 * a * (d_d - d_{pred})}}{2 * a}$$

$$V_t = V + a * \Delta T_{acc}$$

$$\Delta T_{acc} = \frac{a * (Rcc - (\Delta T_{st} - \Delta T_j - \Delta T_0)) - \sqrt{\left(a * (Rcc - (\Delta T_{st} - \Delta T_j - \Delta T_0))\right)^2 + 4 * a * (d_d - d_{pred})}}{2 * a}$$

$$V_t = V + a * \Delta T_{acc}$$

$$\Delta T_{acc} = \frac{(d_d - d_{pred})}{a * (Rcc - (\Delta T_{st} - \Delta T_j - \Delta T_0))} \qquad V_t = V - a * \Delta T_{acc}$$

$$Rcc = \frac{d_{40\text{-}140} + \frac{H}{\cos(\alpha(n+1))} + d_{ps} * \tan(\alpha(n+1))}{v_c} - delay + \Delta T_{acc} + \frac{d_{ps} - V * \Delta T_{acc} + \frac{1}{2} * \Delta T_{acc}{}^2}{V_t}$$

$$\Delta T_{adj1} = (t_j(n+1) - t_{STOP2}(n) - \Delta T_{dec})^{dec}$$

$$\Delta T_{acc1} = \frac{(d_{pred} - d_{dpred1})}{a * \Delta T_{adj1}}$$

$$V_{tt} = V_t + a * \Delta T_{acc1}$$

METHOD AND SYSTEM FOR STORING FLEXIBLE DOCUMENTS

RELATED APPLICATION

The present invention claims priority from International Patent Application IT 102023000001515 filed Jan. 31, 2023, the disclosure thereof is incorporated by reference herein in its entirety.

FIELD OF INVENTION

The present invention relates to a method and system for storing flexible documents in a storing and issuing module, the storing and issuing module being configured to store and issue flexible documents such as banknotes and paper documents, the method and system configured for being used in a flexible document receiving and dispensing device allowing in a simple, reliable, and effective way handling larger storage capacity than traditional equipment.

In the following, reference will be mainly made to banknotes as flexible documents. However, it should be noted that the method and system according to the invention may be used to store and issue any other type of flexible documents, including paper documents such as checks, notes, certificates and licenses, still remaining within the scope of protection of the present invention defined by the attached claims.

BACKGROUND OF THE INVENTION

Equipment for automatic deposit and withdrawal of banknotes are used not only in banking sites but also in retail sites, as help for tellers or as customer-operated machines.

This kind of equipment includes banknote receiving and dispensing devices, optionally having function of recycling, each one comprising one or more storing and issuing modules which can be removably mounted within a respective housing, wherein each module is configured to store a given banknote denomination, also depending on the size thereof.

The number of employed modules determines denominations and/or types of banknotes to be handled, as well as dimensions and cost of the equipment.

In fact, in use, the different denominations or types of banknotes are associated to a very different number of storing and issuing operations. For example, a module receiving denominations of banknotes of greater circulation, such as 20 euros and 50 euros banknotes, normally needs to satisfy high request of storing and issuing operations, often varying over time, and it can easily become full or empty thereby limiting functionality of the whole device. To compensate for this drawback, the addition of modules for storing and issuing banknotes with greater circulation in an equipment for automatic deposit and withdrawal of banknotes could be considered. However, this would result in high costs and is not efficient for storage room dimensioning.

A prior art device for storing and issuing single denomination banknotes is disclosed in document EP2104638. As schematically shown in FIG. 1, such prior art storing and issuing module includes, among other elements, a storage roller 70 operatively associated with a motor (not shown) and at least one transport tape 170 configured to be rolled on the storage roller 70 together with banknotes, when the associated motor is activated. Before entering the storing and issuing module, through a respective opening 110 thereof, the banknotes are transported on a conveyor belt (not shown) and are deviated therefrom by at least one diverter 102 comprised in the storing and issuing module and controlled by at least one respective electromagnet. The diverter 102 is arranged at opening 110, which is formed in one side of the storing and issuing module facing the conveyor belt, and in proximity of a pair of input transport rollers 60-60'; the banknotes are thus conveyed in a linear conveying section 120 extending from the opening 110 to the outer diameter of the storage roller 70. Through such conveying section 120 each banknote entering the storage and issuing device is guided along one banknote channel (delimited by bottom and top lever arms 75 and 76) to the outer diameter of the storage roller 70. In FIG. 1, two cases are represented, namely:

- a first case where the module has not received any banknote yet, and the diameter of the assembly formed by the storage roller 70 and the transport tape 170 is substantially equal to the diameter of the storage roller 70, and
- a second case, wherein the module has already received a certain number of banknotes, and the diameter of the assembly formed by the storage roller 70, the transport tape 170 and the banknotes substantially corresponds to the diameter of storage roller 70, plus the thickness of the transport tape 170 rolled up with the banknotes around storage roller 70.

At conveying section 120 the storing and issuing module is provided with photoelectric sensors 140 (at a preset distance form opening $d_{110-140}$) configured for detecting the presence of banknotes in respective areas of detection of the conveying section 120 and sending a corresponding activation signal(s) causing activation of the motor associated to storage roller 70. The storing and issuing module is also provided with an electronic unit 80 and holding means, such as pairs of pinch-rollers (not represented in FIG. 1) which can be actuated for engaging the banknotes to be stored with transport tape 70, in response to a suitable control signal imparted by an electronic unit 80 of the storage and issuing module, when the photoelectric sensors 140 have sensed one banknote on the conveying section 120.

The maximum distance in the conveying section 120 between the opening 110 and the holding means and the distance between the holding means and the outer diameter of the storage roller 70 must be smaller than the smallest size of the denominations to be stored on or issued from the storage roller 70, for instance such distance must be lower than 62 millimeters for five euros (€ 5) banknotes.

The electronic unit 80 of the storing and issuing module of the prior art is programmed for controlling the holding means and the motor of the storage roller 70 based on the physical parameters of the device, the length of the banknote and in response to signals from the photoelectric sensors 140, so as to store the banknotes on the storage roller with void space queuing providing substantial contact between the input edge of an entering banknote and the output edge of a last stored banknote.

Such prior art storing and issuing module has a great reliability. Nevertheless, it has a limited storage capacity up to 600 banknotes, and also can be subject to frequent jamming, caused by banknotes overlapping on transport tape 170. The banknotes, in fact, during their transport on conveyor belt and inside the storing and issuing module, can accidentally contact parts of the equipment, if they are not perfectly planar (which is frequent, especially if the banknotes to be stored are used ones). This causes their rotation with respect to a longitudinal axis of conveyor belt and their consequent partial overlapping on transport tape 170, when they are stored in the storage and issuing module. Such partial overlapping can cause the jamming of the equipment, its temporary stop and requires maintenance operations, thereby increasing the operating costs.

It is therefore an object of the present invention to allow in a simple, reliable and effective way maximizing storage capacity of flexible documents, such as banknotes to be stored in and issued from a storing and issuing module, while reducing jamming events caused by their partial overlapping.

SUMMARY OF THE INVENTION

It is a specific subject matter of the present invention a method for storing a series of flexible documents in a system, each flexible document having a front side and a rear side and the system comprising:

at least one storing and issuing module, one conveyor belt having a longitudinal symmetry axis y-y extending inside the storing and issuing module, the conveyor belt being configured for supporting and transporting said flexible documents into said at least one storing and issuing module at known conveying speed $v_c$, one sensor group, arranged with respect to said conveyor belt in such a way that it can sense each flexible document of the series entering the system and being transported on said conveyor belt, and provide corresponding dimension information and position information on the sensed flexible document, with respect to said longitudinal symmetry axis y-y;

at least one external sensor unit, arranged along said conveyor belt between the sensor group and the storing and issuing module, at a pre-set distance from the storing and issuing module and configured for sensing the passage of each flexible document of the series and providing at least position information thereof, with respect to said longitudinal symmetry axis y-y;

and a central processing unit, operatively connected to said sensor group, said at least one external sensor unit and said at least one storing and issuing module and configured to receive, process and store at least said dimension information and position information, when it is provided by said sensor group and said at least one external sensor unit, and send corresponding signals to said at least one storing and issuing module;

wherein in said at least one the storing and issuing module one opening is formed, through which each flexible document of the series can enter the same with its front side, and be transported through a linear conveying section of the storing and issuing module, the storing and issuing module having at least:

a storage roller configured for being actuated by a motor;

one transport tape configured to be dragged in rotation by the storage roller around the same;

an internal sensor unit, arranged along the linear conveying section at a pre-set distance from opening and configured for sensing the passage of each flexible document of the series on the linear conveying section and providing position information thereof, with respect to said longitudinal symmetry axis y-y;

holding means, arranged at said conveying section, at a predefined distance from the internal sensor unit and configured for engaging each flexible document of the series with the transport tape, when it has entered the storing and issuing module through opening, the engagement occurring along a linear path of transport tape where transport tape is configured to be moved at linear speed $v_t(t)$, according to a conventional pattern having a constant speed value V at regime operational conditions, before being rolled on storage roller;

one processor, operatively connected, to said central processing unit, and also operatively connected at least to said storage roller, motor, holding means, and internal sensor unit and configured to receive, process and store said signals transmitted by said central processing unit, at least said position information of each flexible document of the series sensed by the internal sensor unit, and send corresponding control signals to said storage roller, motor, and holding means, and internal sensor unit;

said method comprising:

A. activating at least said sensor group, said at least one external sensor unit and said internal sensor unit, for sensing each flexible document of the series, while it is transported into the storing and issuing module during storage operations, and providing corresponding dimension information and position information with respect to the longitudinal symmetry axis y-y to the central processing unit or processor; and B. when a flexible document B(n) is sensed by said internal sensor unit inside the storing and issuing module, and C. if a next flexible document B(n+1) transported on conveyor belt toward the storing and issuing module is sensed and corresponding position information for the next flexible document B(n+1) is provided to the central processing unit and forwarded to processor before said internal sensor unit stops sensing said flexible document B(n), and also if the next flexible document B(n+1) is within a predetermined storage distance $d_{ST}$ from the storing and issuing module, D. based on dimension information and the last obtained position information on the flexible document B(n), dimension information and the last obtained position information on the next flexible document B(n+1) and known design parameters of the system, determining by processor the actual minimum distance $d_{pred}$, along an axis $y_{MIN}$-$y_{MIN}$ parallel to longitudinal symmetry axis y-y, that would be left on transport tape, between the rear side of flexible document B(n) and the front side of the next flexible document B(n+1) of the series, if transport tape moved at linear speed $v_t(t)$ according to a conventional pattern having a constant speed value V at regime operational conditions, E. comparing by processor the actual minimum distance $d_{pred}$ calculated at step D with a desired minimum distance $d_d$, and F. if the actual minimum distance $d_{pred}$ is different from the desired minimum distance $d_d$, adjusting linear speed $v_t(t)$ of transport tape with respect to the conventional pattern, by sending corresponding control signals through processor, between a time instant $t_j(n)$ at which flexible document B(n) is engaged with transport tape and a time instant $t_j(n+1)$ at which the next flexible document B(n+1) is engaged with transport tape inside the storing and issuing module, such that:

the desired minimum distance $d_d$ along said axis $y_{MIN}$-$y_{MIN}$ parallel to the longitudinal symmetry axis y-y is left on transport tape between the rear side of the flexible document B(n) and the front side of the next flexible document B(n+1), and when, at $t_j(n+1)$, the next flexible document B(n+1) is engaged with transport tape, the linear speed value of transport tape is the constant speed value V of said conventional pattern of transport tape linear speed $v_t(t)$ at regime operational conditions.

According to another aspect of the invention, said position information provided by said sensor group, said at least one external sensor unit and said internal sensor unit can comprise at least the angular displacement α(n) of the sensed flexible document B(n), with respect to an axis parallel to the longitudinal symmetry axis y-y and the minimum linear distance Y(n) of the sensed flexible document B(n) from one lateral edge of said conveyor belt or transport tape.

According to a further aspect of the invention, said position information of the next flexible document B(n+1) can be provided by one between sensor group and at least one external sensor unit, whichever sensed the next flexible document B(n+1) last, and said position information for flexible document B(n) can be provided by one between the sensor group, the at least one external sensor unit and the internal sensor unit, whichever sensed the flexible document B(n) last.

According to an additional aspect of the invention, said actual minimum distance $d_{pred}$ can be a function of the time interval Rcc between the time instant $t_j(n)$ at which the rear side of flexible document B(n) would engage with transport tape and start moving therewith inside the storing and issuing module, and the time instant $t_j(n+1)$ at which the rear side of the next flexible document B(n+1) would engage with transport tape and start moving therewith inside the storing and issuing module, estimated based on the last available position information of flexible document B(n) and the next flexible document B(n+1).

According to another aspect of the invention, said actual minimum distance $d_{pred}$ can be a function of:

a value err(n) indicating how far away is a rear side of flexible document B(n) with respect to opening of the storing and issuing device when, at tj(n), that flexible document is engaged with transport tape, along an axis $y_{MIN}$-$y_{MIN}$ parallel to the longitudinal symmetry axis y-y where the distance between the entering flexible document B(n) and the next flexible document B(n+1) is the lowest; and a value err(n+1), calculated along the same axis $y_{MIN}$-$y_{MIN}$ where err(n) is calculated, indicating how far away is a front side of flexible document B(n+1), with respect to opening of the storing and issuing device, when that flexible document B(n+1) enters the storing and issuing module.

According to a further aspect of the invention, said speed $v_t(t)$ of transport tape can be adjusted according to an updated pattern defining over time a line segment or chain of line segments, optionally an isosceles trapezoidal pattern.

According to an additional aspect of the invention, said updated pattern can be based on:

an acceleration value a;

the constant speed value V of the conventional pattern of transport tape linear speed $v_t(t)$, at regime operational conditions;

the estimated rate value Rcc;

the actual minimum distance $d_{pred}$ and the desired minimum distance $d_d$.

According to another aspect of the invention, if position information for the next flexible document B(n+1) transported on conveyor belt toward the storing and issuing module is provided after said internal sensor unit stops sensing said flexible document B(n), and/or if the next flexible document B(n+1) is not within a predetermined storage distance $d_{ST}$ from the storing and issuing module, said method can comprise:

G. bringing linear speed $v_t(t)$ of transport tape to zero, and

H. keeping transport tape stopped at least until position information for the next flexible document B(n+1) transported on conveyor belt toward the storing and issuing module is obtained and the next flexible document B(n+1) is within the predetermined storage distance $d_{ST}$ from the storing and issuing module or the next flexible document B(n+1) that had been sensed before the internal sensor unit stopped sensing flexible document B(n) moves within the predetermined storage distance $d_{ST}$ from the storing and issuing module.

According to a further aspect of the invention, transitional stop time interval:

can be pre-set value; or can be calculated based on position information of the entering flexible document B(n) and the next flexible document B(n+1); or can be calculated based on position information of the entering flexible document B(n) only, if no information on the next flexible document B(n+1) is available.

According to an additional aspect of the invention, after position information for the next flexible document B(n+1) transported on conveyor belt toward the storing and issuing module is obtained or the next flexible document B(n+1) that had been sensed before the internal sensor unit stopped sensing flexible document B(n) moves within the predetermined storage distance $d_{ST}$ from the storing and issuing module, said method can comprise:

D2. calculating, based at least on dimension information and the last obtained position information on flexible document B(n), the last obtained position information on the next flexible document B(n+1) and known design parameters of the system, said actual minimum distance $d_{pred}$, along an axis $y_{MIN}$-$y_{MIN}$ parallel to longitudinal symmetry axis y-y, that would be left between the rear side of said flexible document B(n) and the front side of the next flexible document B(n+1) on transport tape, if transport tape moved according to said conventional pattern linear speed $v_t(t)$.

E2. comparing the actual minimum distance $d_{pred}$ calculated at step D2 with the desired distance $d_d$ and, F2. if the actual minimum distance $d_{pred}$ is different from the desired minimum distance $d_d$, adjusting, by sending corresponding control signals through processor, linear speed $v_t(t)$ of transport tape with respect to the conventional pattern, within the time instant $t_j(n+1)$ at which the next flexible document B(n+1) is engaged with transport tape inside the storing and issuing module, such that the desired distance $d_d$ along said axis $y_{MIN}$-$y_{MIN}$ parallel to the longitudinal symmetry axis y-y is left on transport tape between the rear side of the entering flexible document B(n) and the front side of the next flexible document B(n+1).

According to another aspect of the invention, said method can comprise, after step F:

I. determining, if updated position information at least on flexible document B(n) is provided to processor, when the flexible document B(n) has moved further inside the storing and issuing module and the internal sensor unit has stopped sensing it inside the storing and issuing module; and L. if so, repeating steps D to F with:

the last obtained position information of flexible document B(n);

the last obtained position information of the next flexible document B(n+1); and wherein:

transport tape linear speed $v_t(t)$ to be adjusted, is the linear speed of transport tape already adjusted at previous step F;

the actual minimum distance $d_{pred1}$ to be estimated, is the one that would be left between the entering flexible document B(n) and the next one B(n+1) on transport tape, if transport tape moved at said already adjusted linear speed $v_t(t)$; and the actual minimum distance $d_{pred1}$ so determined, is to be compared with the actual minimum distance $d_{pred}$ estimated at previous step D.

It is also a specific subject matter of the present invention a system for storing a series of flexible documents, each flexible document having a front side and a rear side, comprising:

at least one storing and issuing module, one conveyor belt having a longitudinal symmetry axis y-y extending inside the storing and issuing module, the conveyor belt being configured for supporting and transporting said flexible documents, into said at least one storing and issuing module at known conveying speed $v_c$, one sensor group, arranged with respect to said conveyor belt in such a way that it can sense each flexible document of the series entering the system and being transported on said conveyor belt, and provide corresponding dimension information and position information on the sensed flexible document, with respect to said longitudinal symmetry axis y-y;

at least one external sensor unit, arranged along said conveyor belt between the sensor group and the storing and issuing module, at a pre-set distance from the storing and issuing module and configured for sensing the passage of each flexible document of the series and providing at least position information thereof, with respect to said longitudinal symmetry axis y-y;

and a central processing unit, operatively connected to said sensor group, said at least one external sensor unit and said at least one storing and issuing module and configured to receive, process and store at least said dimension information and position information, when it is provided by said sensor group and said at least one external sensor unit, and send corresponding signals to said at least one storing and issuing module;

wherein in said at least one the storing and issuing module one opening is formed, through which each flexible document of the series can enter the same with its front side, and be transported through a linear conveying section of the storing and issuing module, the storing and issuing module having at least:

a storage roller configured for being actuated by a motor;

one transport tape configured to be dragged in rotation by the storage roller around the same an internal sensor unit, arranged along the linear conveying section at a pre-set distance from opening and configured for sensing the passage of each flexible document of the series on the linear conveying section and providing position information thereof, with respect to said longitudinal symmetry axis y-y;

holding means, arranged at said conveying section, at a predefined distance from the internal sensor unit and configured for engaging each flexible document of the series with the transport tape, when it has entered the storing and issuing module through opening, the engagement occurring along a linear path of transport tape where transport tape can be moved at linear speed $v_t(t)$ before being rolled on storage roller;

one processor, operatively connected, to said central processing unit, and also operatively connected at least to said storage roller, motor, holding means, and internal sensor unit and configured to receive, process and store said signals transmitted by said central processing unit, at least said position information of each flexible document of the series sensed by the internal sensor unit, and send corresponding control signals to said storage roller, motor, and holding means, and internal sensor unit;

said system being configured to execute the method as described above.

It is further a specific subject matter of the present invention a computer program product comprising instructions to cause the system above to execute the steps of the method above described.

It is an additional a specific subject matter of the present invention a computer-readable medium having stored thereon said computer program product.

BRIEF DESCRIPTION OF THE DRAWINGS

The present invention will be now described, by way of illustration and not by way of limitation, according to its preferred embodiments, with particular reference to the attached Figures, wherein.

In the Figures identical reference numerals will be used for alike elements.

DETAILED DESCRIPTION OF THE PREFERRED EMBODIMENTS

Figure 2:
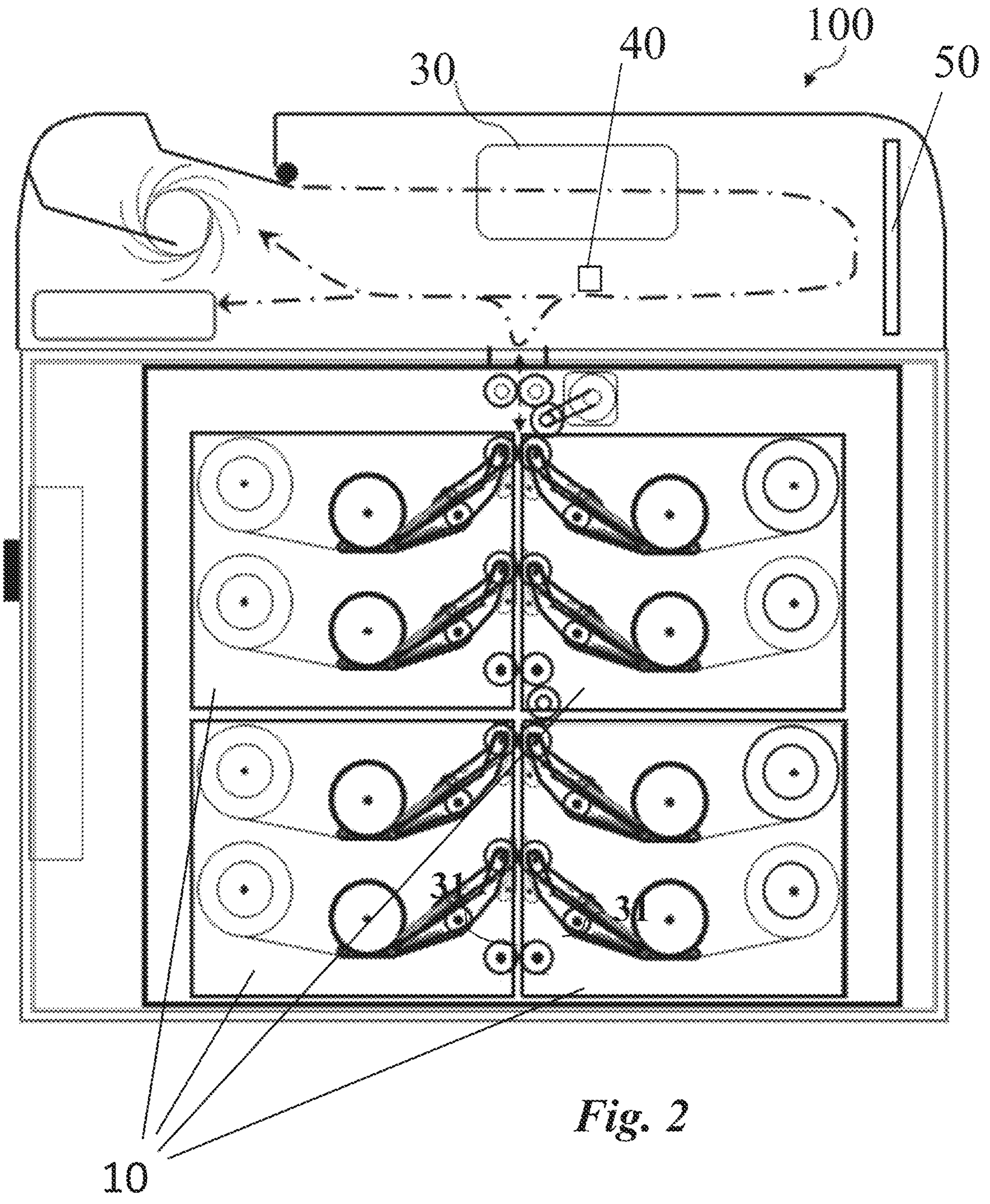
FIG. 2 is a schematic representation of one exemplary embodiment of a flexible document receiving and dispensing device comprising a system 100 according to the invention.
Figure 3:
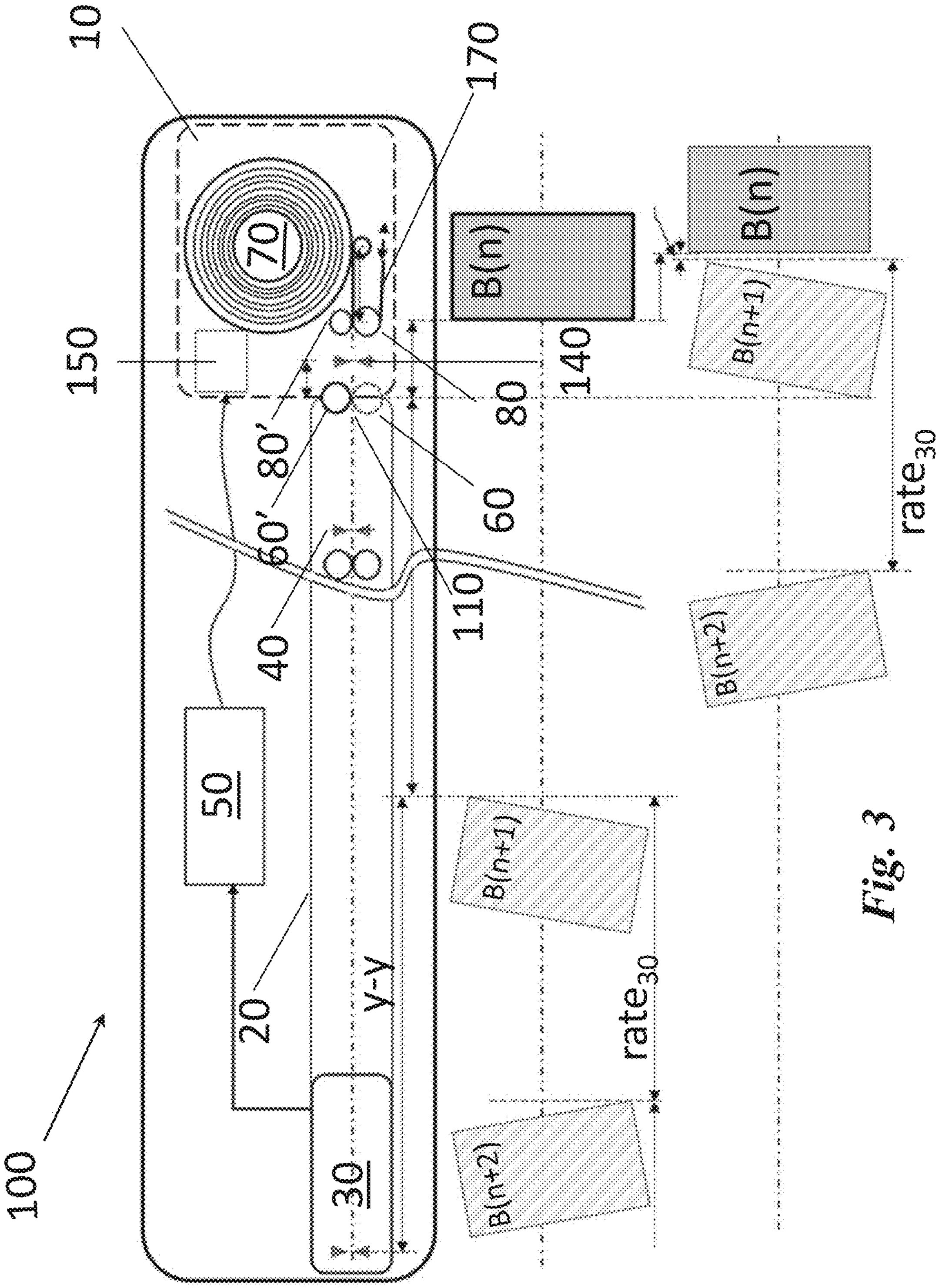
FIG. 3 shows a schematic representation of the main components of the system according to the invention.

With particular reference to FIGS. 2 and 3, it will be appreciated that a system according to the present invention, for storing a series ( . . . , B(n−1), B(n), B(n+1), . . . ) of flexible documents and more particularly banknotes, is generally indicated with reference numeral 100, and can be included in a receiving and dispensing device as represented for example in FIGS. 2 and 3.

Such a system 100 comprises at least one storing and issuing module (in FIG. 2 a plurality of them is represented, numbered with reference number 10) for the automation of cash activities, one conveyor belt 20, having a longitudinal symmetry axis y-y extending inside the storing and issuing module 10, and configured for supporting and transporting the banknotes in the receiving and dispensing device into the storing and issuing module at known substantially constant conveying speed $v_c$, and one sensor group 30, arranged with respect to conveyor belt 20 in such a way that it can sense each banknote B(n) of the series entering the system, transported on conveyor belt 20 toward the storing and issuing module, and provide corresponding dimension information and position information thereof, with respect to the longitudinal symmetry axis y-y.

The system 100 also comprises at least one external sensor unit 40, each one arranged along conveyor belt 20 between sensor group 30 and the storing and issuing module 10, at a pre-set distance from the storing and issuing module 10, and configured for sensing the passage of each banknote B(n) of the series, at that pre-set distance from the storing and issuing module 10, and providing at least position information thereof, with respect to the longitudinal symmetry axis y-y.

In a preferred embodiment of the invention the external sensor unit 40 is only one, placed in proximity of the storing and issuing module, for example at 172 mm from the storing and issuing module 10. However, the skilled person would easily understand that other external sensor units 40 could be provided along conveyor belt 20, for example arranged at locations where conveyor belt 20 makes sharp bends inside the receiving and dispensing device and it is most probable that the banknotes are subject to undesired rotation with respect to the longitudinal symmetry axis y-y, so that position information of the sensed banknote B(n) can also be obtained after those sharp bends.

Figure 4:
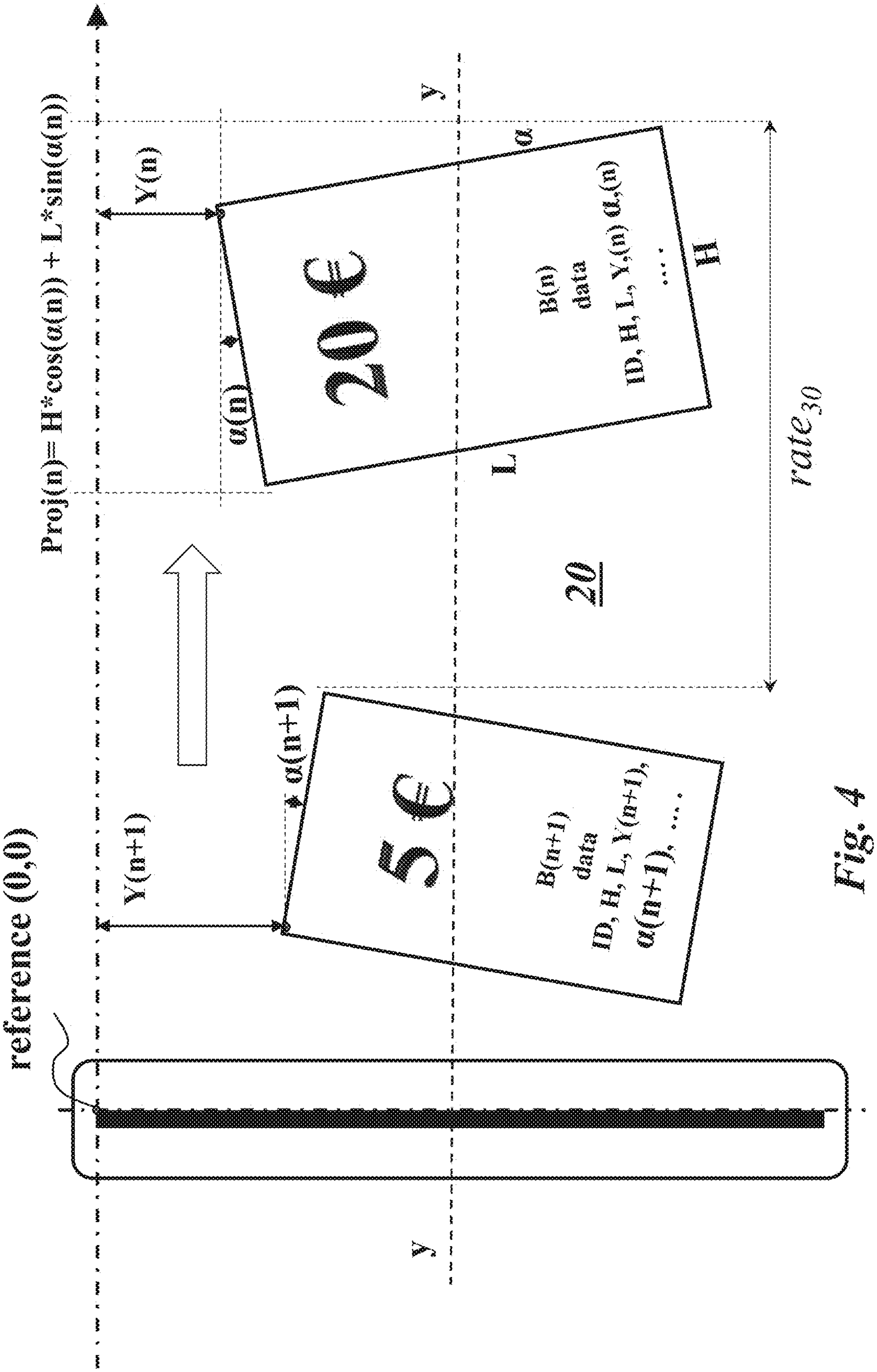
FIG. 4 shows a sensor group and two banknotes transported on conveyor belt of invention system.

According to the invention, the dimension information provided by sensor group 30, see FIG. 4, comprises at least the length L and the height H of each sensed banknote B(n). As can be appreciated, in fact, different denominations or banknote types can have different dimensions (length L and height H, in FIG. 5)—a 5 euros banknote, for example, is smaller than a 20 euros banknote.

The position information that can be provided by both sensor group 30 and the at least one external sensor unit 40 comprises at least the angular displacement of each sensed banknote B(n) with respect to an axis parallel to the longitudinal symmetry axis y-y of conveyor belt 20, and the minimum linear distance (Y in FIG. 4) of each banknote of the series, from one lateral edge of conveyor belt 20.

With reference to the angular displacement of each sensed banknote B(n) with respect to an axis parallel to the longitudinal symmetry axis y-y of conveyor belt 20, as anticipated above, the banknotes can be subject to rotation while they are transported on conveyor belt 20 and, therefore, their front side (i.e, the side of the banknote facing the storing and issuing module) can be not perfectly perpendicular to the longitudinal symmetry axis y-y of conveyor belt 20 and can show, instead, an angular displacement or skew, corresponding to an angle α(n) represented in FIG. 4 with respect to an axis parallel to the longitudinal symmetry axis y-y. By watching FIG. 4, for example, it can be appreciated that two banknotes transported on conveyor belt 20 into the storing and issuing module 10 can show positive or negative angular displacements. The 20 euros banknote B(n), for example, has a negative skew, showing its lower right corner as front end, while the 5 euros banknote, has a positive skew, showing its upper right corner as front end. If a banknote B(n) had its front side perfectly perpendicular to the longitudinal symmetry axis of conveyor belt 20, the corresponding angular displacement or skew angle α(n) would be zero.

Position information provided by sensor group 30 as represented in FIG. 4, also comprises the time interval, referred to as $rate_{30}$, between a time instant at which a front end of a next banknote B(n+1) is sensed by sensor group 30 and the time instant at which sensor group 30 has sensed a front end of a previous banknote B(n) of the series transported on conveyor belt 20. Of course, if the banknotes sensed by sensor group was the very first one and second of the series, no time interval between banknotes could be provided by sensor group 30 for the first banknote. Optionally, sensor group 30 can also provide the denomination of the sensed banknote B(n), see references ID in FIG. 4. The ID is associated to the denomination of the sensed banknote and can be used to determine to which storing and issuing module 10 of a receiving and dispensing device the banknote should be sent for storage, in case system 100 was provided with more than one storing and issuing module 10.

System 100 for implementing the present invention further comprises a central processing unit 50, which is directly or indirectly operatively connected to the sensor group 30, the at least one external sensor unit 40 and the storing and issuing module 10, and is configured to receive, process and store at least dimension information and position information, when it is provided by the sensor group 30 and the at least one external sensor unit 40, and send corresponding signals to the storing and issuing module 10, according to the method of the present invention, that will be described in the following.

With particular reference to the storing and issuing module 10 (in the present description, for simplicity, reference will be made to a system comprising only one storing and issuing module 10 as represented in FIG. 3), in the storing and issuing module an opening 110 is formed and respective input transport rollers 60-60' are comprised at said opening 110, that can be actuated in a known way to engage with a front side of an entering banknote B(n) of the series ( . . . , B(n−1), B(n), B(n+1), . . . ) of banknotes, in order to guide it inside the storing and issuing module 10 toward a respective storage roller 70, along a conveying section 120 having the same longitudinal symmetry axis y-y of conveyor belt 20.

The storing and issuing module 10 comprises, in fact, a storage roller 70 and also a feeding-roller (the latter not shown in the Figures) as well as respective motors (also not shown in the Figures), the motors being configured to coordinately actuate the storage roller 70 and the feeding-roller, upon receipt of a suitable control signal.

The storing and issuing module 10 also comprises one transport tape 170, having one end connected to storage roller 70 and the other end connected to feeding-roller. The transport tape 170, during banknotes storage operations and due to corresponding coordinated activation of the above motors, is configured to be unrolled from feeding-roller and rolled on storage roller 70 along a forward path such that it is moved along a linear path with a linear speed $v_t(t)$, at the end of conveying section 120, before being rolled around storage roller 70.

The storing and issuing module 10 also comprises an internal sensor unit 140, arranged along the linear conveying section 120 at a pre-set distance from opening 110 and configured for sensing the passage of each banknote B(n) of the series, at that pre-set distance from opening 110, on the linear conveying section 120 and providing at least position information thereof, with respect to said longitudinal symmetry axis y-y. The position information provided by the internal sensor unit 140 is the same as provided by the at least one external sensor unit 40, i.e. the angular displacement or skew angle α(n) of each sensed banknote B(n) with respect to an axis parallel to the longitudinal symmetry axis y-y and the minimum linear distance Y(n) of the banknote B(n) from the lateral edge of transport tape 170.

With reference to the at least one external sensor unit 40 and the internal sensor unit 140, they both can comprise a plurality of sensors of any suitable kind, optionally two photo-sensors, spaced apart from each other of a distance $d_{ps}$, along a direction perpendicular to the longitudinal symmetry axis (according to the plan view of FIG. 5) and directed toward conveyor belt 20 and transport tape 170, respectively, each sensor defining a corresponding field of view (see FOW of the same Figure) at which a banknote can be sensed. Both the at least one external sensor unit 40 and the internal sensor unit 140:

- start sensing a banknote of the series travelling toward storage roller 70, as soon as the front side of that banknote enters one of the fields of view of their sensors, and
- stop sensing that banknote, as soon as the rear side of that banknote has left the last field of view of their sensors, having moved forward, closer to storage roller 70.

Accordingly, position information can be provided twice by the external sensor unit 40 and the internal sensor unit 140. The angular displacement α(n), for example, can be calculated as soon as the front side of the entering banknote B(n) has been sensed by at least two sensors of the corresponding (external or internal) sensor unit and also as soon as the rear side of the banknote B(n) has been sensed by at least two sensors of the of the corresponding (external or internal) sensor unit.

The skilled person, however, will easily understand that other configurations of the at least one external sensor unit 40 and internal sensor unit 140 are possible. They could be image sensors of any suitable kind, or arrays of photo-sensors arranged in any suitable way or even cameras, as long as they can sense the passage of the banknotes on conveyor belt 20 and transport tape 170, at predefined distances, outside and inside the storing and issuing module 10 respectively, and determine position information as described above, with respect to the longitudinal symmetry axis y-y.

The storing and issuing module 10 further comprises holding means arranged at conveying section 120 at a predefined distance from the internal sensor unit 140, which are configured to be actuated for engaging an entering banknote B(n) with transport tape 170, when the entering banknote B(n) has completely entered the storing and issuing module, i.e. when the rear side of that banknote, passing through opening 110, has disengaged from input transport rollers 60-60'. In detail, the holding means include two pair of pinch-rollers 80 and 80' arranged below and above transport tape 170. The pinch-rollers are configured to mutually shift under control of electromagnets (the electromagnets not being shown in the Figures).

Figure 5:
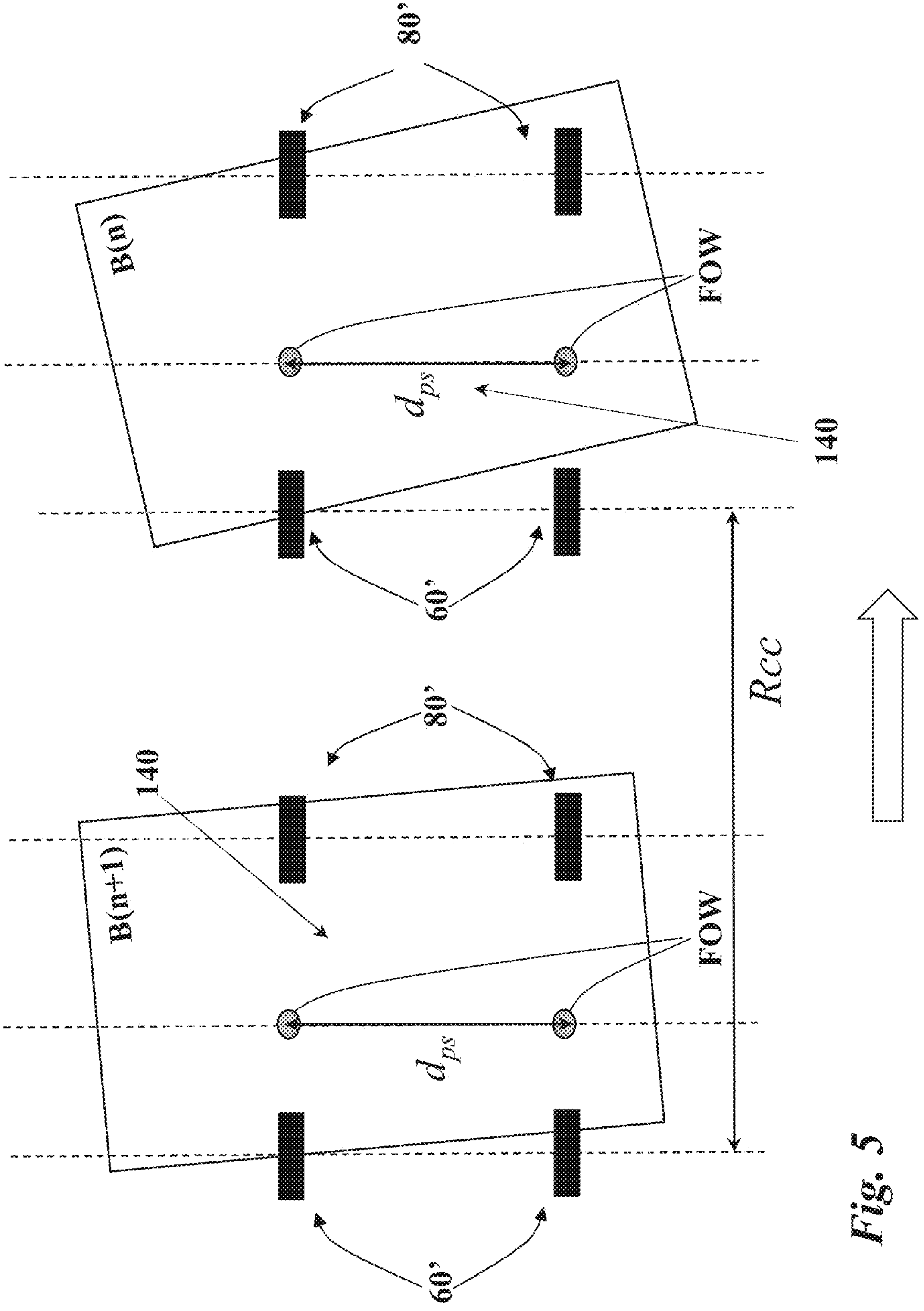
FIG. 5 is a schematic representation of an entering banknote B(n)—represented on the right—and the next banknote B(n+1) of a series of banknotes—represented on the left—at respective time instants $t_y(n)$ and $t_y(n+1)$, when they are engaged with transport tape inside the storing and issuing module, during storage operations, according to the invention method.

With such a configuration of system 100, it will be noted that any banknote B(n), transported by conveyor belt 20 into the storing and issuing module 10, enters the storing and issuing module 10 at constant conveying speed $v_c$ and only when its rear side (as shown in FIG. 5) is disengaged from input transport roller 60-60' and is substantially at the same time $t_j(n)$ engaged by holding means 80-80', it starts moving at transport tape linear speed $v_t(t)$.

The substantially constant conveying speed $v_c$ at which conveyor belt 20 moves is, for example, about 1400 mm/s.

Figure 1:
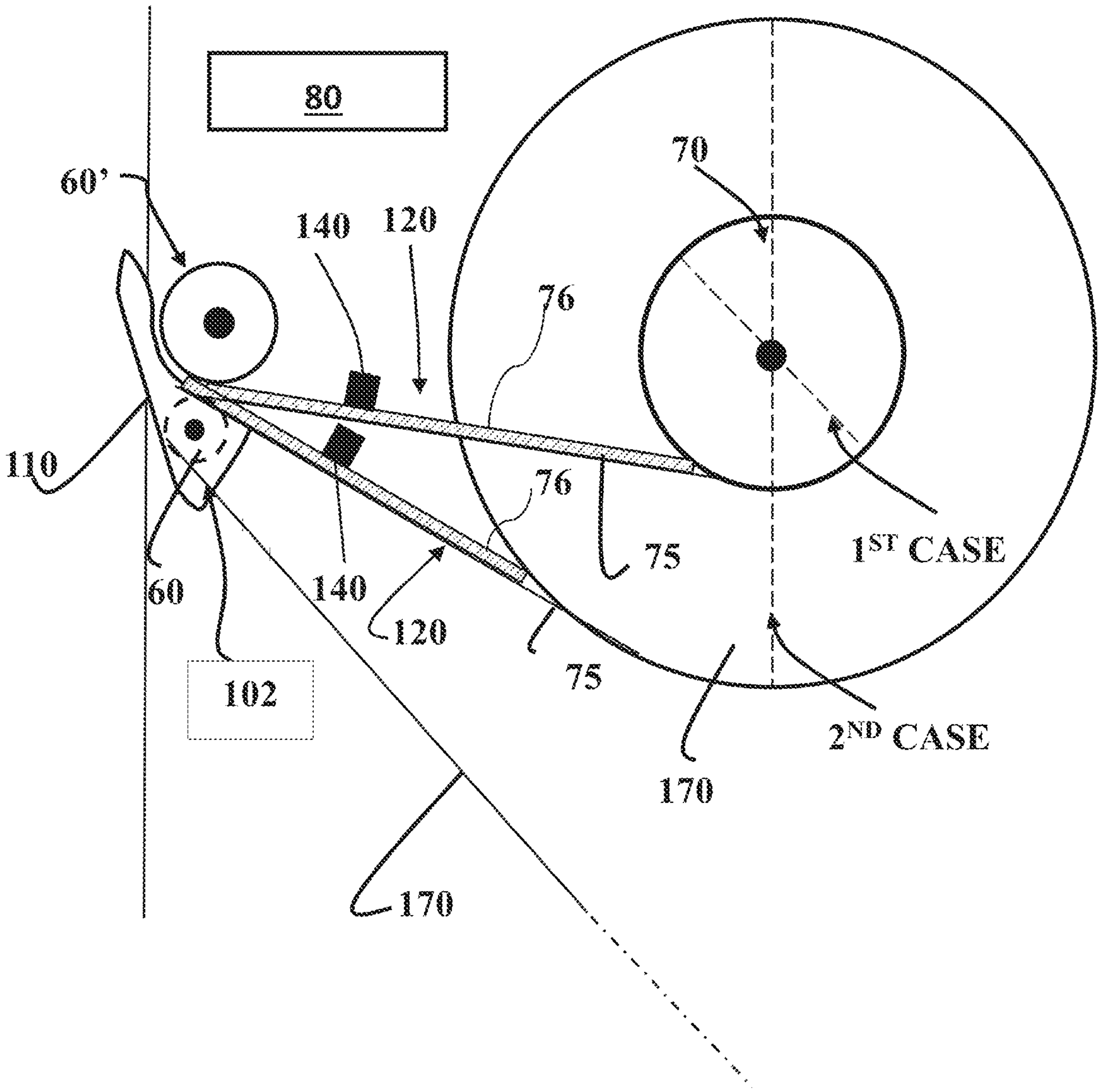
Fig. 1 (PRIOR ART)
FIG. 1 shows a schematic lateral view of the main elements of a storing and issuing module according to the prior art.

Transport tape 170 linear speed $v_t(t)$, instead, has a conventional pattern showing a constant speed value V at regime operational conditions, i.e. apart from transitional start and stop time intervals of the storage roller 70 driving motor, where linear speed of transport tape $v_t(t)$ shows a constant (positive or negative) acceleration between zero and the constant speed value V or vice-versa. The constant speed value V of transport tape linear speed $v_t(t)$ at regime operational conditions depends on:

- a banknote height H,
- a known desired distance $d_d$ that one would like to leave between banknotes on transport tape 170, and a mean time interval between banknotes (also known as the nominal rate or the nominal time interval of the banknote sent to the storing and issuing module 10) at average operating condition. As already described above with respect to prior art storing and issuing module of FIG. 1, according to the conventional pattern of transport tape speed, the transitional start time interval starts when the internal sensor unit 140 start sensing the entering banknote B(n).

As an example, for storage of 5 euros banknotes in a storing and issuing module, constant speed value V of transport tape linear speed at regime operational conditions, i.e. not considering transitional start and stop time intervals of the storage roller 70 driving motor, is about 469 mm/s.

The storing and issuing module 10 also comprises one processor 150, operatively connected at least to the central processing unit 50 and to the storage roller 70 and feeding roller motors, the holding means 80-80' and the internal sensor unit 140. The processor 150 is configured to receive, process and store at least said signals transmitted by the central processing unit 50 and at least the position information of each banknote of the series sensed by the internal sensor unit 140, and send corresponding control signals at least to the storage roller 70 driving motor, and holding means 80, 80'.

Processor 150 is also configured to determine the pattern of linear speed $v_t(t)$ of transport tape 170 during storage of a banknote B(n), according to invention method 1, and send corresponding control signals to the storage roller 70 motor and holding means 80-80'.

Figure 8:
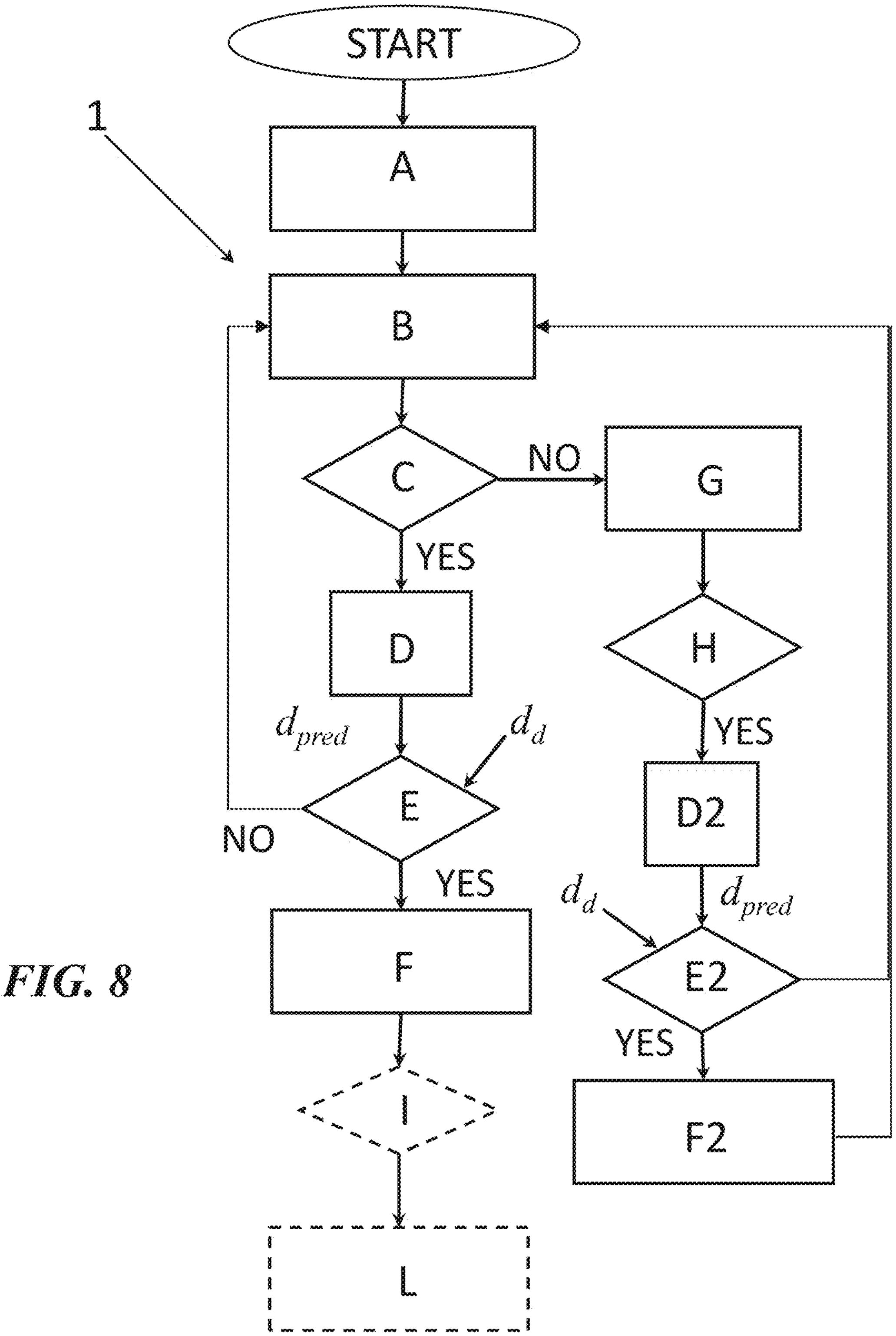
FIG. 8 is a flow chart of the main steps of the method according to the invention.
Figure 9:
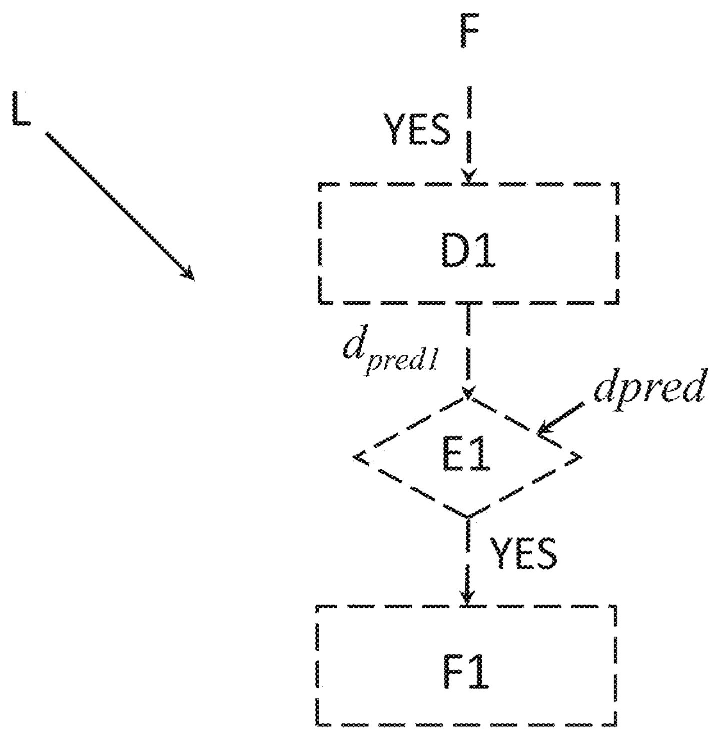
FIG. 9 is a detail flow chart representation of the main sub steps of an optional step of the invention method according to the invention.

Method 1 of the present invention for storing a series ( . . . , B(n−1), B(n), B(n+1), . . . ) of flexible documents, more particularly banknotes, in a storing and issuing module 10 of the system 100 described above, is indicated in FIGS. 8 and 9 by reference numeral 1 and comprises, as first step A, activating at least the sensor group 30, at least one external sensor unit 40 and the internal sensor unit 140, for sensing each banknote ( . . . , B(n−1), B(n), B(n+1), . . . ) of the series, while it is transported into the storing and issuing module 10 for storage operations, and providing corresponding dimension information and position information (as already described above) with respect to the longitudinal symmetry axis y-y to the central processing unit 50 or processor 150.

Then, method 1 comprises determining when the internal sensor unit 140 starts sensing each banknote B(n) entering inside the storing and issuing module 10 (step B), i.e. the front side of banknote B(n) enters a field of view of its sensors, and if (step C) a next banknote B(n+1) transported on conveyor belt 20 toward the storing and issuing module 10 is sensed and corresponding position information for the same is provided to the central processing unit 50 and forwarded to processor 150 before said internal sensor unit 140 stops sensing that banknote B(n), having that banknote moved further closer to storage roller 70 inside the storing and issuing module 10, and also if the next banknote B(n+1) is within a predetermined storage distance $d_{ST}$ from the storing and issuing module 10, then invention method 1 comprises calculating at following step D an actual minimum distance $d_{pred}$, along an axis $y_{MIN}$-$y_{MIN}$ parallel to longitudinal symmetry axis y-y, that would be left on transport tape 170, between the rear side of the entering banknote B(n) and the front side of the next banknote B(n+1), if transport tape 170 moved according to the conventional pattern of transport tape linear speed $v_t(t)$, having a constant speed value V at regime operational conditions.

According to an advantageous aspect of the present invention, the actual minimum distance $d_{pred}$ between such banknotes is calculated based on dimension information and the last obtained position information on banknote B(n), the last obtained position information on the next banknote B(n+1) and known design parameters of the system, as will be better described below.

Further to that, method 1 of the invention comprises, at following step E, comparing the actual minimum distance $d_{pred}$ calculated at step D with the desired minimum distance $d_d$ above and, (at step F) if the actual minimum distance $d_{pred}$ is different from the desired minimum distance $d_d$, invention method 1 comprises adjusting, by sending corresponding control signals through processor 150, linear speed $v_t(t)$ of transport tape 170 with respect to the conventional pattern, between the time instant $t_j(n)$ at which banknote B(n) is engaged with transport tape 170 and the time instant $t_j(n+1)$ at which the next banknote B(n+1) is engaged with transport tape 170 inside the storing and issuing module, such that:

the desired minimum distance $d_d$ along said axis $y_{MIN}$-$y_{MIN}$ parallel to longitudinal symmetry axis y-y is left on transport tape 170 between the rear side of the entering banknote B(n) and the front side of the next banknote B(n+1), and when, at $t_j(n+1)$, the next banknote B(n+1) is engaged with transport tape 170, the linear speed value of transport tape 170 is said constant speed value V of the conventional pattern of transport tape linear speed $v_t(t)$, at regime operational conditions;

otherwise, no adjustment of transport tape linear speed $v_t(t)$ is implemented and the invention method 1 moves back to step B where the process is repeated when the internal sensor unit 140 starts sensing a next banknote B(n+1) entering the storing and issuing module 10.

With particular reference to the last obtained position information of banknotes B(n) and B(n+1), it should be noted that, when the internal sensor unit 140 starts sensing banknote B(n), the last obtained position information for the next banknote B(n+1) is provided by one between sensor group 30 and at least one external sensor unit 40, whichever has sensed the next banknote B(n+1) last. In fact, when the internal sensor unit 140 starts sensing the entering banknote B(n), the following scenarios are possible. It is possible that the next banknote B(n+1):

has not entered the system 100 yet and, in this case, it hasn't been sensed by sensor group 30 nor by the at least one external sensor unit 40—in this case no position information is available for the next banknote B(n+1) when the entering banknote B(n) starts being sensed by the internal sensor unit 140;

has been sensed by sensor group 30 but has not reached the at least one external sensor unit 40 yet—in this case position information available for the next banknote B(n+1) is provided by sensor group 30;

has been sensed by sensor group 30 and by the external sensor unit 40—in this case position information provided by the at least one external sensor unit 40 is the one better reflecting the real position of the next banknote B(n+1) on conveyor belt (because the banknote could have rotated and/or slowed down on conveyor belt 20 since it entered the system and was sensed by sensor group 30) and is the one used for calculating actual minimum distance $d_{pred}$.

Moreover, after the internal sensor unit 140 has started sensing the entering banknote B(n), and before the internal sensor unit 140 stops sensing it, when the banknote B(n) has moved further inside the storing and issuing module 10 toward storage roller 70, in other words during sensing of banknote B(n), other scenarios are possible for the next banknote B(n+1). During sensing of an entering banknote B(n), in fact, it can happen that the next banknote B(n+1):

- does not enter the system 100 and, in this case, it is not sensed either by sensor group 30 or by the at least one external sensor unit 40—no position information is available for banknote B(n+1) before the internal sensor unit 140 stops sensing banknote B(n);
- is sensed by sensor group 30 but does not reach the at least one external sensor unit 40 before the internal sensor unit 140 stops sensing banknote B(n)—in this case the last obtained position information for banknote B(n+1) is provided by sensor group 30;
- is sensed by both sensor group 30 and the at least one external sensor unit 40—in this case, position information provided by the at least one external sensor unit 40 is the one better reflecting the real position of the next banknote B(n+1) on conveyor belt (because the banknote could have rotated and/or slowed down on conveyor belt 20, since it entered the system and was sensed by sensor group 30) and is the one used for calculating actual minimum distance $d_{pred}$.

Moreover, position information for banknote B(n) can be provided by one between the sensor group 30, the at least one external sensor unit 40 and the internal sensor unit 140, whichever has sensed the banknote B(n) last. In fact, banknote B(n) entering the storing and issuing module 10 has certainly already passed through the sensor group 30 and the at least one external sensor unit 40, when the internal sensor unit 140 starts sensing it. However, position information on banknote B(n) can also be provided by the internal sensor unit 140 during sensing, as already explained above. For example, when the internal sensor unit 140 is provided with two sensors as explained above with reference to system 100, i.e. in case where two photo-sensors are arranged symmetrically with respect to the longitudinal symmetry axis y-y (see for example plan view of FIG. 5) so that, when a banknote is rotated on conveyor belt 20 and on transport tape 170, its front side is detected first by one of the two sensors, and then from the other, then position information for banknote B(n) can be provided by the internal sensor unit 140:

- as soon as the front side of banknote B(n) has passed through all fields of view of the internal sensor unit 140 sensors (first provision), and
- as soon as the rear side thereof, has left the last field of view of the internal sensor unit 140 sensors (second provision).

Figure 10A:
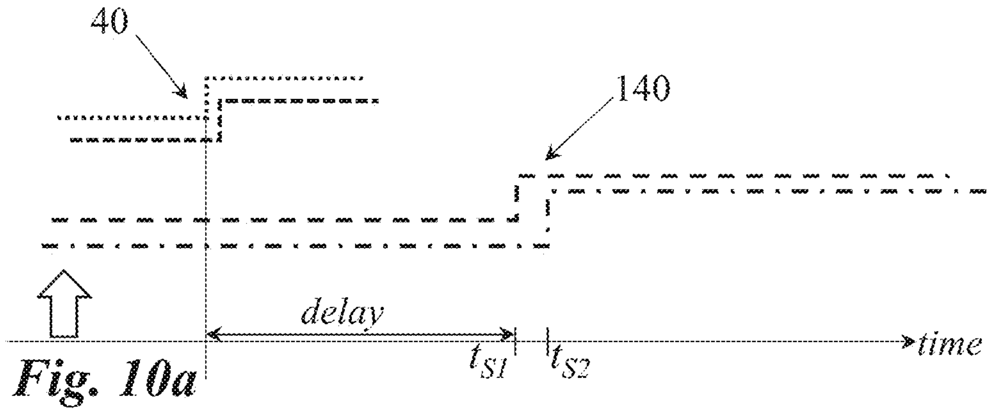
FIGS. 10*a* to 10*d* are schematic representations of sensing signals provided by sensor group/units of the system according to the invention.
Figure 10B:
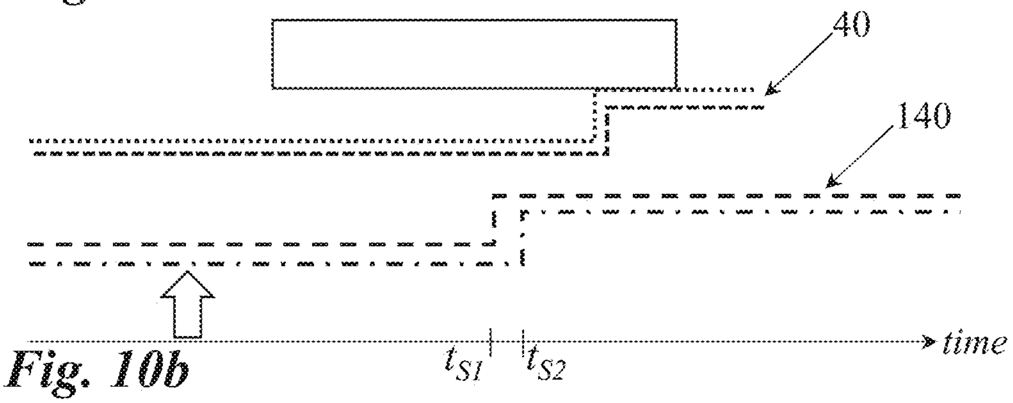
Figure 10C:
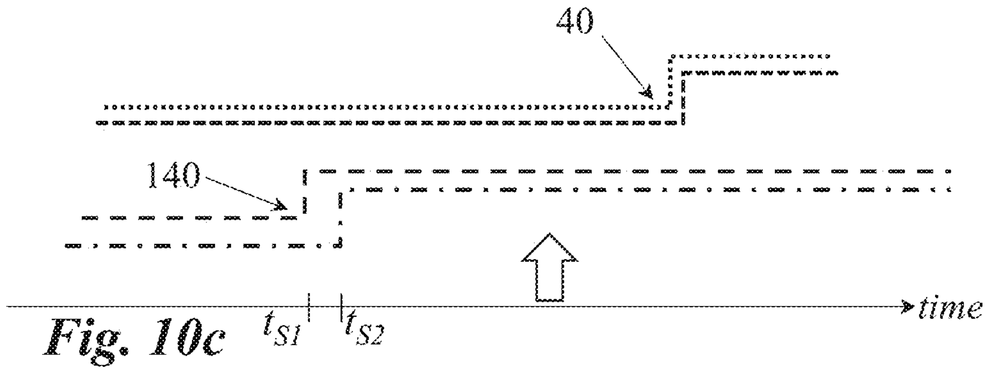
Figure 10D:
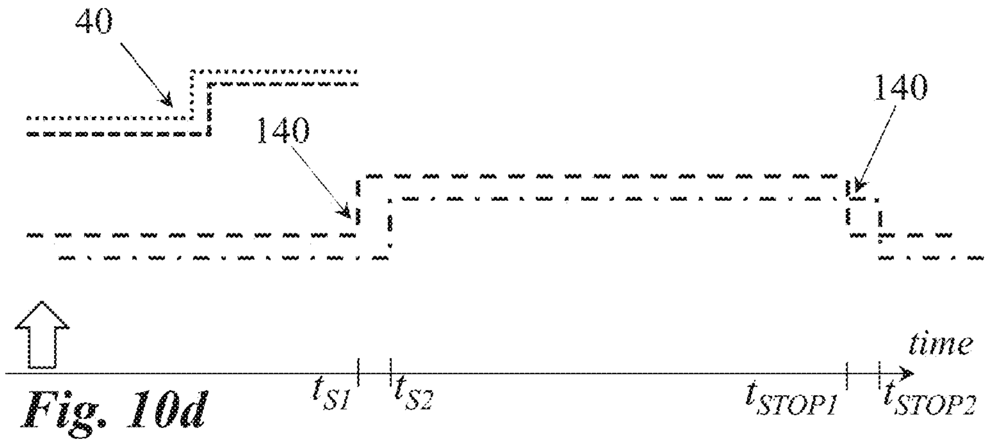

Just to give few examples, some of the cases described above are graphically represented in FIGS. 10*a* to 10*d*. Those Figures show:

- switching signals emitted by the internal sensor unit 140, during sensing of the entering banknote B(n)—see the dotted lines corresponding to arrow 140;
- switching signals emitted by the at least one external sensor unit 40, during sensing of the next banknote B(n+1)—see the dotted lines corresponding to arrow 140; and
- the time instant at which the next banknote B(n+1) is sensed by sensor group 30 (white arrow), over time, in a case wherein only one external sensor unit 40 is provided in the system 100, and both the internal sensor unit 140 and the external sensor unit 40 comprise two photo-sensors (each one providing a corresponding switching signal as represented in the Figures) arranged symmetrically with respect to the longitudinal symmetry axis y-y (as in FIG. 5 for the internal sensor unit 140) so that, when a banknote is rotated on conveyor belt 20 and on transport tape 170, its front side is detected first by one of the two sensors, and then from the other. In those Figures also indicated is:

- the time instant $t_{S1}$ at which the first sensor of internal sensor unit 140 starts sensing a banknote;
- the time instant $t_{S2}$ at which the second sensor of internal sensor unit 140 starts sensing a banknote; and
- the corresponding time instants $t_{STOP1}$ and $t_{STOP2}$ at which the first and the second sensors of the internal sensor unit 140 stop sensing the same (FIG. 10*d*).

With reference now to step D of invention method 1 and the calculation of the actual minimum distance $d_{pred}$ that would be left between the entering banknote B(n) and the next one B(n+1) on transport tape 170 if transport tape 170 moved at a linear speed $v_t(t)$ according to the conventional pattern, it should be noted that according to a preferred embodiment of the invention, such actual minimum distance $d_{pred}$ is also a function of the time interval between the time instant $t_j(n)$ at which the rear side of entering banknote B(n) would engage with transport tape 170 and start moving therewith inside the storing and issuing module 10, and the time instant $t_j(n+1)$ at which the rear side of the next banknote B(n+1) would engage with transport tape 170 and start moving therewith inside the storing and issuing module. This time interval, which will be referred to in the following as estimated rate value or Rcc, can also be easily calculated based on the last obtained angular displacement of both the entering banknote B(n) and the next one B(n+1), banknotes dimension H and L, and other system parameters. Of course, the estimated rate value Rcc is a lower value than the rate value provided by sensor group 30 ($rate_{30}$), if the entering banknote B(n) underwent a rotation or slew down during its trip toward the storing and issuing module 10.

In a first non-limiting example, in a case where position information on B(n+1) is provided by the external sensor unit 40 as represented in FIG. 10*a*, and in system 100:

- only one external sensor unit 40 is provided at distance $d_{40\text{-}140}$ from the internal sensor unit 140,
- both the external sensor unit 40 and the internal sensor unit 140 comprise two photo-sensors, arranged perpendicularly with respect to longitudinal axis y-y (see FIG. 5), which are spaced apart from each other of distance $d_{ps}$, given the known constant conveying speed $v_c$ and also known rate ($rate_{30}$) provided by sensor group 30, then $R_{cc}$ as represented in FIG. 5, can be calculated as:

$$Rcc = \frac{d_{40-140}}{v_c} - \text{delay} - \frac{\left(\frac{H}{\cos(\alpha(n))} + d_{ps} * \tan(\alpha(n)) - \frac{H}{\cos(\alpha(n+1))} + d_{ps} * \tan(\alpha(n+1))\right)}{v_C}$$

where delay is the time interval between the time instant at which the external sensor unit 40 started sensing the next banknote B(n+1) and the time instant at which the internal sensor unit 140 started sensing the entering banknote B(n), which can be easily obtained by processor 150.

Figure 6:
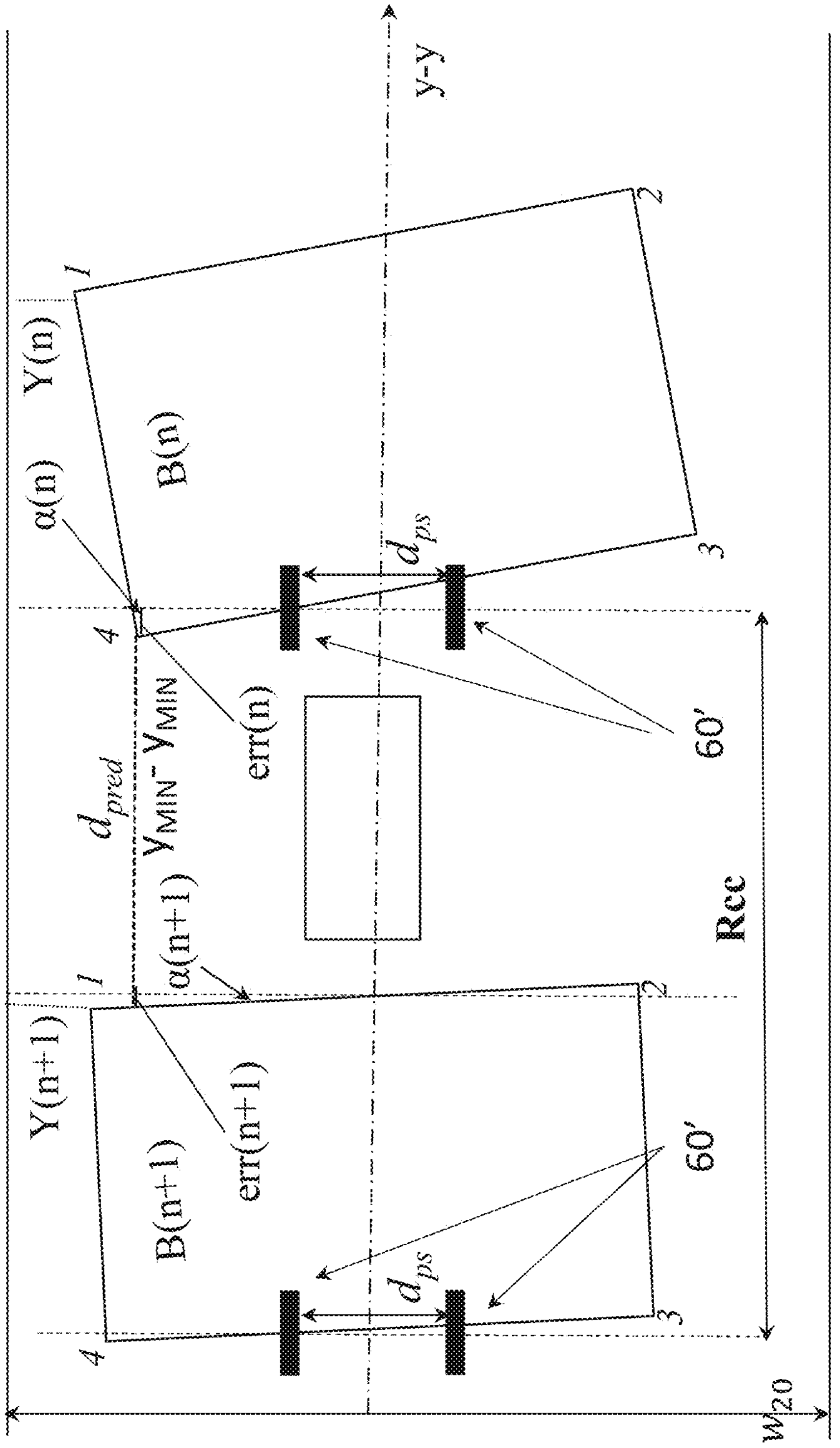
FIG. 6 is a schematic representation of an entering banknote B(n)—represented on the right—and the next banknote B(n+1) of a series—represented on the left—at respective time instants $t_y(n)$ and $t_y(n+1)$, when they are engaged with transport tape inside the storing and issuing module, during storage operations. Both banknotes show a negative angular displacement with respect to an axis parallel to a longitudinal symmetry axis y-y.

In a second not limiting example, where position information on B(n+1) is provided by sensor group 30, as represented in FIG. 10*b* and FIG. 6, no delay value is available when the internal sensor unit 140 starts sensing the entering banknote B(n) and, the estimated rate can be calculated according to the following formula:

$$Rcc = \text{rate}_{30} - \frac{\left(\left[Proj(n) - \left(\frac{w_{20} - d_{ps}}{2} - x_4(n)\right) * \tan(\alpha(n))\right] - \left[Proj(n+1) - \left(\frac{w_{20} - d_{ps}}{2} - x_4(n+1)\right) * \tan(\alpha(n+1))\right]\right)}{v_C}$$

where:

- Proj(n) is the projection of the entering banknote B(n) along the longitudinal symmetry axis y-y, which is a function of the angular displacement α(n) of banknote B(n) with respect to said axis y-y; and
- Proj(n+1) is the projection of the next banknote B(n+1) along the longitudinally symmetry axis y-y, which is a function of the angular displacement α(n+1) of banknote B(n+1) with respect to said axis y-y;
- $v_c$ is the constant conveying speed of conveyor belt 20; and
- $w_{20}$ is the width of conveyor belt 20.

Figure 7:
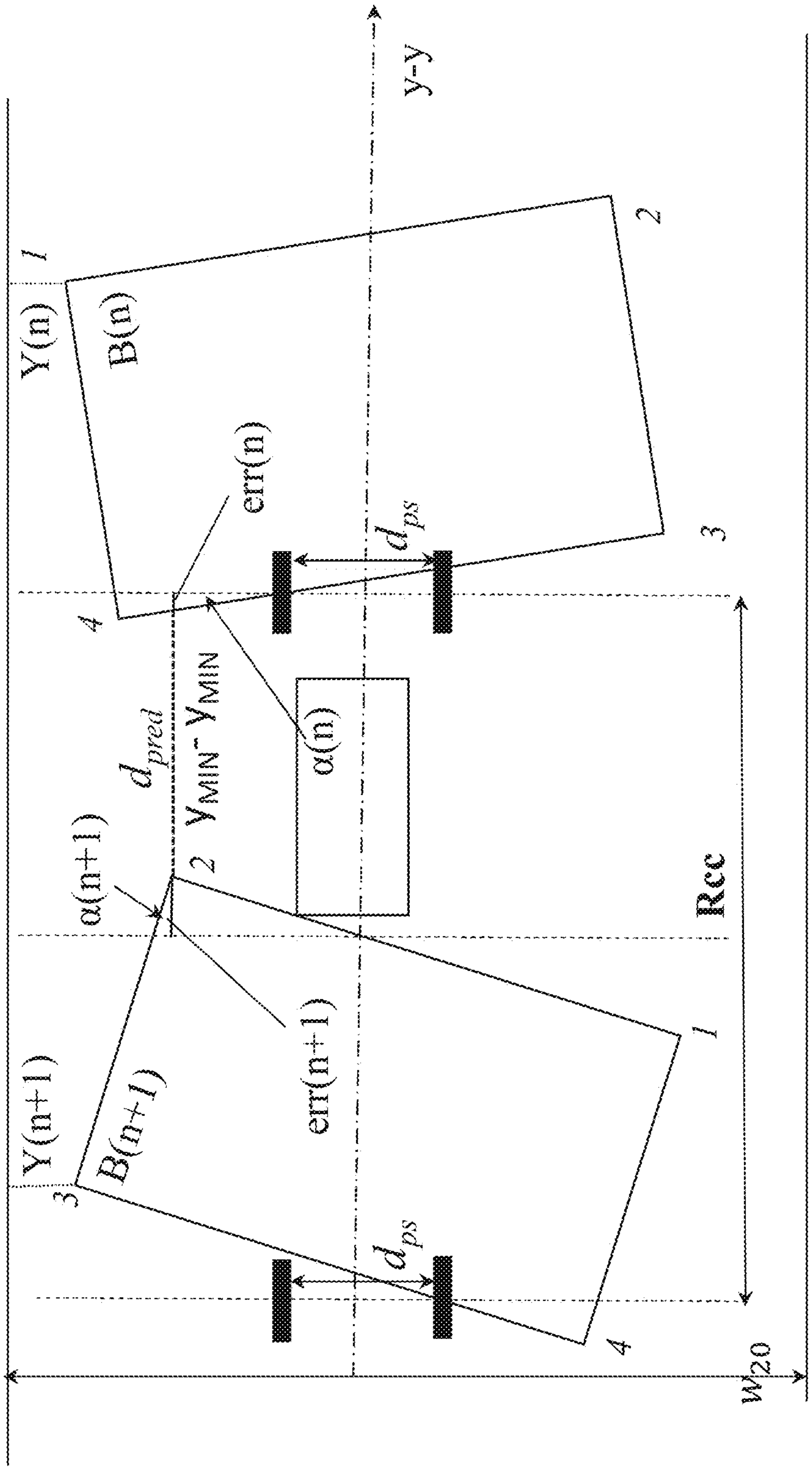
FIG. 7 is a schematic representation of an entering banknote B(n)—represented on the right- and the next banknote B(n+1) of a series—represented on the left—at respective time instants $t_y(n)$ and $t_y(n+1)$, when they are engaged with transport tape inside the storing and issuing module, during storage operations. The banknotes show opposite angular displacements with respect to an axis parallel to a longitudinal symmetry axis y-y.

With reference to the calculation of the estimated rate value Rcc, the skilled person will easily understand that the formula used to determine that value differs based on the mutual position between banknote B(n) and the next banknote B(n+1). If, with the same system described above, banknotes had, for example, opposite angular displacements with respect to an axis parallel to longitudinal symmetry axis y-y, as represented in FIG. 7, at the same conditions illustrated in FIG. 10*b*, then Rcc would be calculated as:

$$Rcc = \text{rate}_{30} - \frac{\left(\left[Proj(n) - \left(\frac{w_{20} - d_{ps}}{2} - x_4(n)\right) * \tan(\alpha(n))\right] - \left[Proj(n+1) - \left(x_4(n+1) - \frac{w_{20} - d_{ps}}{2} - \right) * \tan(\alpha(n+1))\right]\right)}{v_C}$$

Of course, the skilled person will easily understand that the indications above regarding the quantification of the estimated rate value Rcc are purely exemplary and many other equivalent ways could be used to determine that value, depending also on system configuration, without departing from the scope of protection of the present invention.

Going back to the invention method 1, once the estimated rate Rcc is determined, then two parameters are calculated by processor 150, namely (as represented, for example, in FIGS. 6 and 7):

- err(n), a value indicating how far away is the rear side of entering banknote B(n) with respect to the input transport rollers 60-60' (i.e with respect to the opening 110 of the storing and issuing module) when, at $t_j$(n), that banknote is engaged with transport tape 170, along the axis $y_{MIN}$-$y_{MIN}$ parallel to the longitudinal symmetry axis y-y where the distance between the entering banknote B(n) and the next banknote B(n+1) is the lowest; and
- err(n+1), a value calculated along the same axis $y_{MIN}$-$y_{MIN}$ where err(n) is calculated and indicates how far away is the front side of banknote B(n+1), with respect to the input transport rollers 60-60'(i.e with respect to the opening 110 of the storing and issuing module), when that banknote enters the storing and issuing module 10.

Parameters err(n) and err(n+1) can be calculated, as functions of the last obtained respective position information (angular displacements α(n) and α(n+1)) of the banknotes and given known system parameters. For example, in case the internal sensor unit 140 comprised two photo-sensors spaced apart from each other of distance $d_{ps}$, where input transport rollers 60-60' comprised two couple of rollers placed of the same distance $d_{ps}$, given conveyor belt 20 width $w_{20}$, and in case |α(n)|≥|α(n+1)| then (see FIG. 6):

$$err(n) = \left(\frac{w_{20} - d_{ps}}{2} - x_4(n)\right) * \tan(\alpha(n))$$

$$err(n+1) = \left(\frac{w_{20} - d_{ps}}{2} - x_4(n)\right) * \tan(\alpha(n+1))$$

$x_4(n)$ corresponding to the distance of banknote B(n) from the lateral edge of conveyor belt 20 where the entering banknote B(n) and the next banknote B(n+1) are closer to each other.

In view of the above, the actual minimum distance $d_{pred}$ that would be left between the entering banknote B(n) and the next banknote B(n+1) if transport tape 170 moved according to the conventional speed pattern, can be easily calculated as a function of Rcc, err(n) and err(n+1) and other system parameters.

For example, in a case according to the second non-limiting example above (FIG. 10*b*), if the entering banknote B(n) was not the very first one of the series, $d_{pred}$ is given by:

$$d_{pred} = V * Rcc - \frac{H}{\cos(\alpha(n+1))} - err(n) + err(n+1) \text{ if } |\alpha(n)| \geq |\alpha(n+1)|; \tag{1}$$

$$d_{pred} = V * Rcc - \frac{H}{\cos(\alpha(n+1))} + err(n) - err(n+1) \text{ if } |\alpha(n)| < |\alpha(n+1)|; \tag{2}$$

$$d_{pred} = V * Rcc - \frac{H}{\cos(\alpha(n+1))} - err(n) - err(n+1) \text{ if } \alpha(n) * \alpha(n+1) < 0. \tag{3}$$

Figure 12:
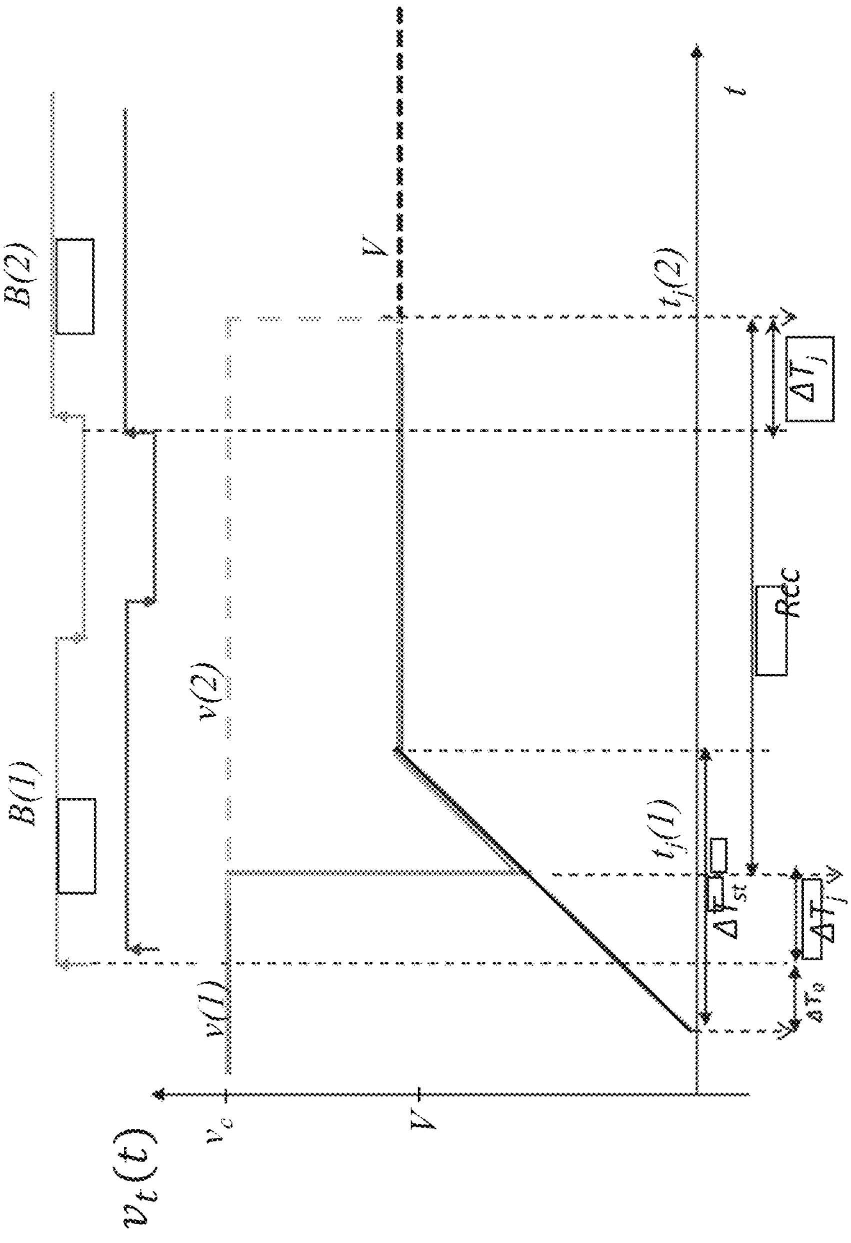
FIG. 12 is a graphical representation according to the prior art of the speed of transport tape, a first and second banknote of a series of banknotes to be stored in the storing and issuing module, before and after the banknotes enter the storing and issuing module of the invention system.

In case the entering banknote B(n) was, instead, the very first one of the series, then $d_{pred}$ must be calculated as explained above and based on system parameters, also taking into account the fact that (see FIG. 12), if transport tape moved according to the conventional speed pattern, when the very first banknote of the series B(1) is engaged with transport tape 170 at $t_j$(1), transport tape is running at the speed of the transitional start time interval, and is not constant. In this case, $d_{pred}$ could be calculated as follows:

$$d_{pred} = V_{start} * (\Delta T_{st} - \Delta T_j - \Delta T_0) + \frac{1}{2} * a * \left(\Delta T_{st}^2 - \left(\Delta T_j^2 + \Delta T_0^2\right)\right) + V * (Rcc - (\Delta T_{st} - \Delta T_j - \Delta T_0)) - \frac{H}{\cos(\alpha(n+1))} - err(n) + err(n+1) \text{ if } |\alpha(n)| \geq |\alpha(n+1)|; \tag{1}$$

$$d_{pred} = V_{start} * (\Delta T_{st} - \Delta T_j - \Delta T_0) + + \frac{1}{2} * a * \left(\Delta T_{st}^2 - \left(\Delta T_j^2 + \Delta T_0^2\right)\right) + V * (Rcc - (\Delta T_{st} - \Delta T_j - \Delta T_0)) - \frac{H}{\cos(\alpha(n+1))} + \tag{2}$$

-continued $$err(n) + err(n+1) \text{ if } |\alpha(n)| < |\alpha(n+1)|;$$

and $$d_{pred} = V_{start} * (\Delta T_{st} - \Delta T_j - \Delta T_0) + + \frac{1}{2} * a * \left(\Delta T_{st}^2 - \left(\Delta T_j^2 + \Delta T_0^2\right)\right) + V * (Rcc - (\Delta T_{st} - \Delta T_j - \Delta T_0)) - \frac{H}{\cos(\alpha(n+1))} - err(n) - err(n+1) \text{ if } \alpha(n) * \alpha(n+1) < 0; \quad (3)$$

where

- $\Delta T_{st}$ is the transitional start time interval, during which transport tape 170 moves at constant acceleration a;
- $\Delta T_j$ is the time interval between when the internal sensor unit 140 starts sensing the entering banknote B(n) and when that banknote starts moving at transport tape speed $v_t(t)$; and
- $\Delta T_0$ is the time interval between when storage roller 70 starts moving and when the internal sensor unit starts sensing the entering banknote B(n). With reference to this time interval, it should be noted that before entering the storing and issuing module 10, the entering banknote B(n) has been sensed by sensor group 30 and the external sensor unit 40, therefore it is possible to program an advanced starting of the driving motor of storage roller 70, so that when at tj(n) the entering banknote B(n) is engaged with transport tape 170, speed of transport tape 170 is not zero.

However, as already indicated above with reference to the estimated rate value Rcc, the skilled person would readily understand that many other equivalent ways could be used, to determine $d_{pred}$, depending also on system configuration, without departing from the scope of protection of the present invention.

According to the invention method 1, once $d_{pred}$ is known, at step F the speed of transport tape 170 is adjusted with respect to the conventional pattern so that the desired minimum distance $d_d$ along said axis $y_{MIN}$-$y_{MIN}$ parallel to longitudinal symmetry axis y-y is left on transport tape 170 between the rear side of the entering banknote B(n) and the front side of the next banknote B(n+1), and when at $t_j(n+1)$ the next banknote B(n+1) is engaged with transport tape 170, the linear speed value of transport tape 170 is the constant speed value V of the conventional pattern of transport tape linear speed $v_t(t)$ at regime operational conditions.

According to an advantageous aspect of the invention, linear speed $v_t$ (t) of transport tape 70 during storage of the entering banknote B(n) is adjusted with respect to the conventional pattern, according to an updated pattern, defining over time a line segment or chain of line segments, optionally an isosceles trapezoidal pattern.

More particularly, according to a preferred embodiment of the invention, the updated pattern of transport tape 170 linear speed $v_t(t)$ is a function of:

- an acceleration value a;
- the constant speed value V of the conventional pattern of transport tape linear speed $v_t(t)$, at regime operational conditions;
- the estimated rate value Rcc;
- the actual minimum distance $d_{pred}$ and the desired distance $d_d$.

Figure 11:
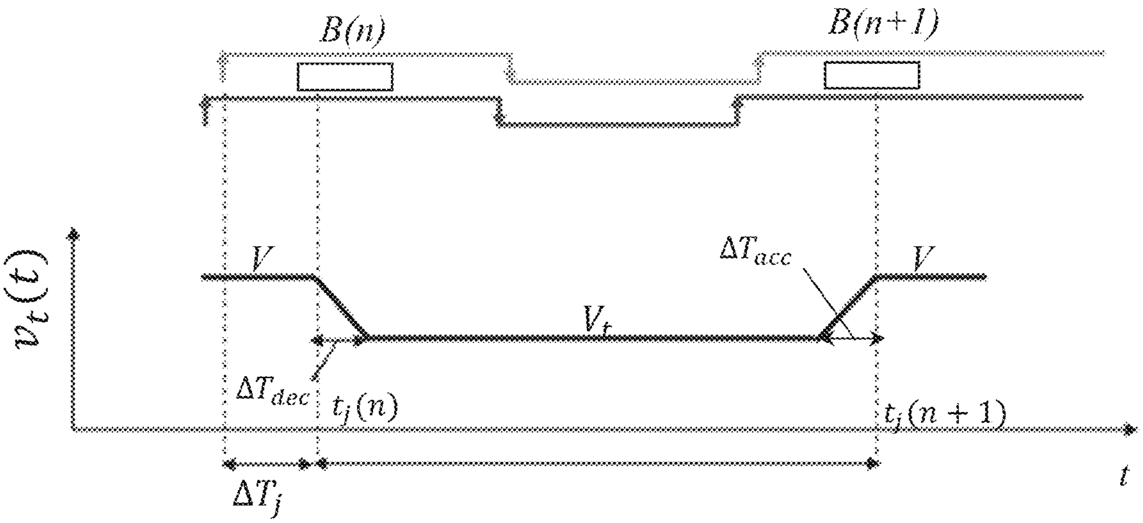
FIG. 11 show two exemplary cases of transport tape speed adjustment, according to the invention method, when the banknotes involved are not the very first one and second of the series.
Figure 11:
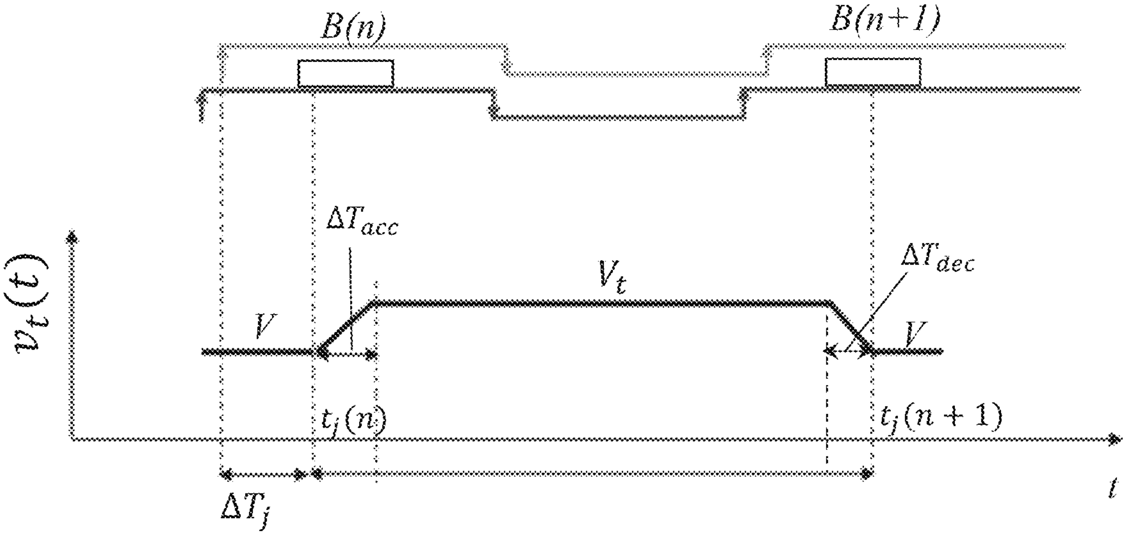

In FIG. 11 (upper part), for example, the updated pattern of transport tape 170 linear speed with corresponding formulas is represented during storage of banknote B(n), in case $d_{pred}>d_d$ (i.e. the two banknotes stored on transport tape would be too far apart from each other if transport tape 170 moved according to the conventional speed patter) so that the entering banknote B(n), after being engaged with transport tape 170, at $t_j(n)$, needs to be slowed down in order to "wait" for the next banknote B(n+1), so that when the next banknote B(n+1) is engaged at $t_j(n+1)$ with transport tape 170, it is properly spaced at desired minimum distance $d_d$ and $v_t(t_j(n+1))$=V.

As represented in that Figure, given the estimated values of Rcc, $d_{pred}$ and $d_d$ and an acceleration value a of transport tape 170, which can be easily obtained by the system, it is possible to calculate the transitional time interval of an initial deceleration $\Delta T_{dec}$, after which transport tape 170 can run at a constant speed $v_r$, before being brought back to constant speed value V of conventional speed pattern, after a transitional acceleration time interval having a duration over time equal to that of the initial deceleration ($\Delta T_{acc}=\Delta T_{dec}$).

On the contrary, see FIG. 11 the lower part, in case $d_{pred}<d_d$ (i.e. the two banknotes on transport tape would be too close to each other or even overlapping thereby increasing the probability of device jamming), the entering banknote B(n), after being engaged with transport tape 170 needs to accelerate in order to increase the actual distance from the next banknote B(n+1) up to $d_d$, and given the estimated rate value Rcc, the difference between $d_{pred}$ and $d_d$ and the acceleration value a, it is possible to calculate the transitional time interval of an initial acceleration $\Delta T_{acc}$, after which transport tape 170 can run at constant speed $v_r$, before being brought back to constant speed value V of conventional speed pattern, after a transitional deceleration time interval having a duration over time corresponding to that of the initial acceleration ($\Delta T_{dec}=\Delta T_{acc}$).

Figure 13:
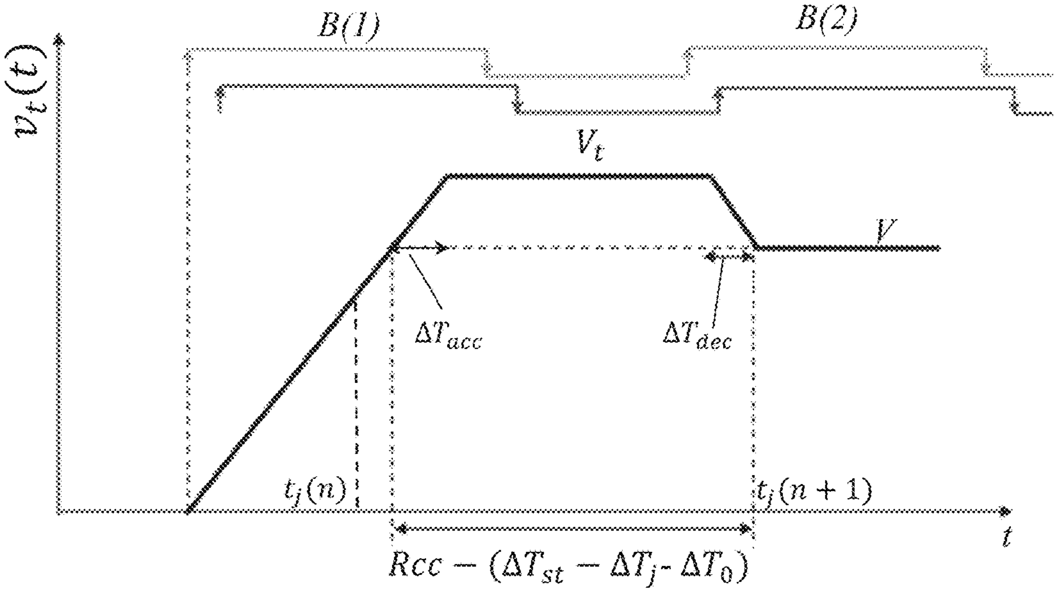
FIG. 13 show two exemplary cases of transport tape speed adjustment, according to the invention method, when the banknotes involved are the very first one and second of the series.
Figure 13:
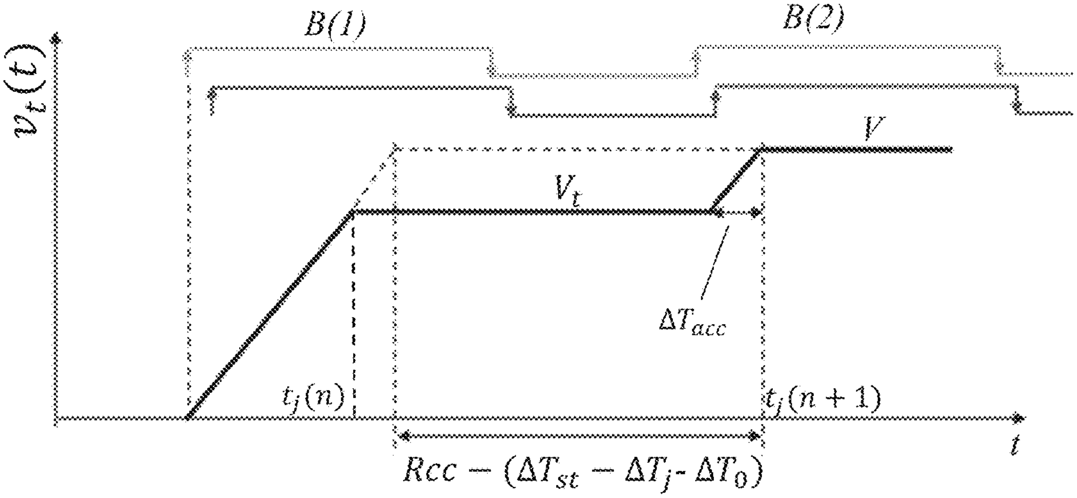

Of course, the skilled person will easily understand that in case the entering banknote B(n) was the very first one of the series, then the formulas involved in the determination of the first transitional acceleration/deceleration time interval and corresponding value of constant speed $v_r$ should be adjusted in a way known to the skilled person, to take into account the fact that (see FIG. 12), if transport tape moved according to the conventional speed pattern, when the very first banknote of the series B(1) is engaged with transport tape 170 at tj(1), transport tape 170 is running at the speed of the transitional start time interval, which is not constant. For example, see the upper part of FIG. 13 (showing the updated pattern of transport tape 170 linear speed with corresponding formulas), if $d_{pred}<d_d$ after being engaged with transport tape 170, banknote B(1) is to be accelerated so that distance $d_d$ is left between that and the next Banknote B(n+1). The acceleration of transport tape, will start according to the preferred embodiment of the invention represented in that Figure, only after banknote B(n) has reached the constant speed value V, and will last for a transitional acceleration time interval $\Delta T_{acc}$ that is a function of Rcc, $d_{pred}$, $d_d$, a, and also $\Delta T_{st}$, $\Delta T_j$ and $\Delta T_0$, as shown in the Figure. After this transitional acceleration time interval, having reached a constant Value $V_r$, transport tape linear speed is lowered through a corresponding deceleration interval $\Delta T_{dec}$, until it reaches the constant speed value V of conventional pattern at $t_j(n+1)$. In the opposite case, instead, wherein $d_{pred}>d_d$, see the lower part of FIG. 13, since it is necessary to lower transport tape linear speed with respect to the conventional pattern, the updated pattern of linear speed is calculated having an initial portion at constant speed $V_r$, starting during the transitional start time interval $\Delta T_{st}$ according to the conventional pattern, and a final acceleration portion $\Delta T_{acc}$.

Method 1 according to the invention optionally comprises after step F, a following step I comprising determining when banknote B(n) has moved further inside the storing and issuing module 10 so that the internal sensor unit 140 has stopped sensing it, and updated position information at least on banknote B(n) is available. In this case, at step L, invention method 1 comprises, repeating steps D to F (in the Figures indicated as steps D1, E1 and F1) with:

the last obtained position information on banknote B(n), the last obtained position information on the next banknote B(n+1), and also taking into account the fact that:

transport tape 170 linear speed $v_t(t)$ to be adjusted, in this case, is the linear speed of transport tape 170 already adjusted at previous step F, which can be constant, but not necessarily equal to the constant speed value V of conventional pattern;

the actual minimum distance, to be estimated at step D1 right after the internal sensor unit 140 has stopped sensing banknote B(n), is now indicated as $d_{pred1}$ and is the one that would be left between the entering banknote B(n) and the next one B(n+1) on transport tape 170 if transport tape 170 moved at adjusted linear speed $v_t(t)$; and the actual minimum distance $d_{pred1}$ so determined, is to be compared at step E1 with the actual minimum distance $d_{pred}$ estimated at step D, and not the desired minimum distance $d_d$.

For example, the case could occur wherein the next banknote B(n+1) is sensed by the at least one external sensor unit 40 only between the time instant at which the internal sensor unit 140 starts sensing the entering banknote B(n) and the time instant at which the internal sensor unit 140 stops sensing the entering banknote B(n). In this case, according to the invention method 1, the actual minimum distance $d_{pred}$ can be calculated (updated) twice:

a first time (steps D to F of method 1), with position information of banknote B(n), provided by the at least one external sensor unit 40, and with position information of the next banknote B(n+1), provided by sensor group 30; and a second time (steps D1 to F1 of method 1 FIG. 9), with position information of banknote B(n) provided by the internal sensor unit 140, and with position information of the next banknote B(n+1), provided by the external sensor unit 40;

and also transport tape linear speed $v_t(t)$ can correspondingly be adjusted twice, before the engagement at $t_j(n+1)$ of the next banknote B(n+1).

Figure 14:
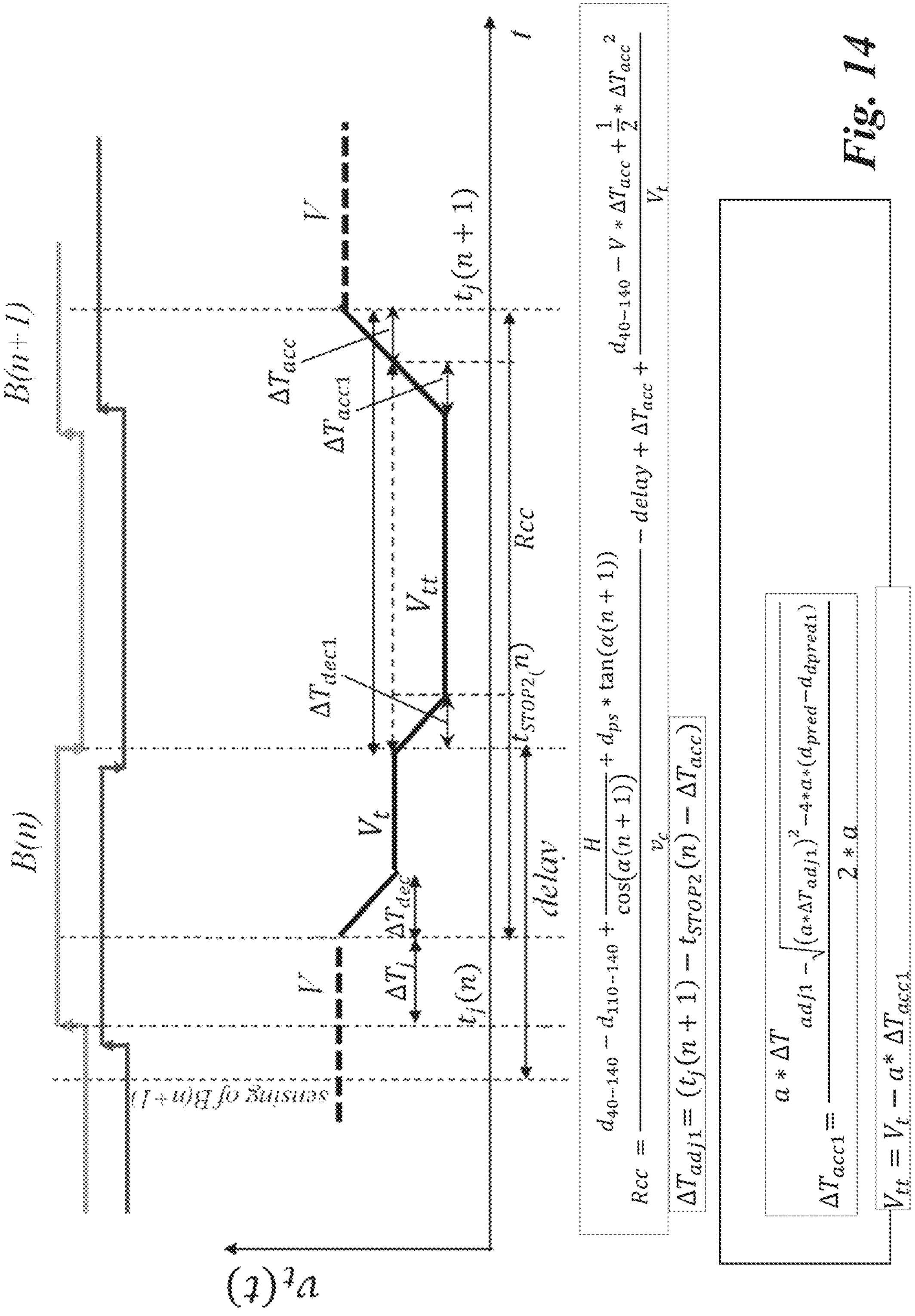
FIG. 14 shows a first exemplary case of a further adjustment of transport tape speed within the storing and issuing module according to the invention method.

According to a preferred embodiment of the invention method, this second adjustment of transport tape linear speed $v_t(t)$ can be carried out during a time interval $\Delta T_{adj1}$ comprised between the time instant $t_{STOP2}(n)$ at which the internal sensor unit 140 stops sensing banknote B(n) and the time instant at which it is estimated that the next banknote B(n+1) is also engaged with transport tape ($t_j(n+1)=t_j(1)+$ Rcc), minus the possible acceleration/deceleration transitional time interval calculated during previous adjustment at step F, as shown in FIG. 14, showing the case of FIG. 10*a*, wherein $d_{pred1}>d_{pred}$ and after the provision of updated position information of banknotes, at step I, $d_{pred1}$ has become larger than $d_{pred}$ (for example, because banknote B(n) has slowed down or rotated some more inside the storing and issuing module) and it is necessary to reduce further the speed of transport tape 170, before engagement of the next banknote B(n+1).

Figure 15:
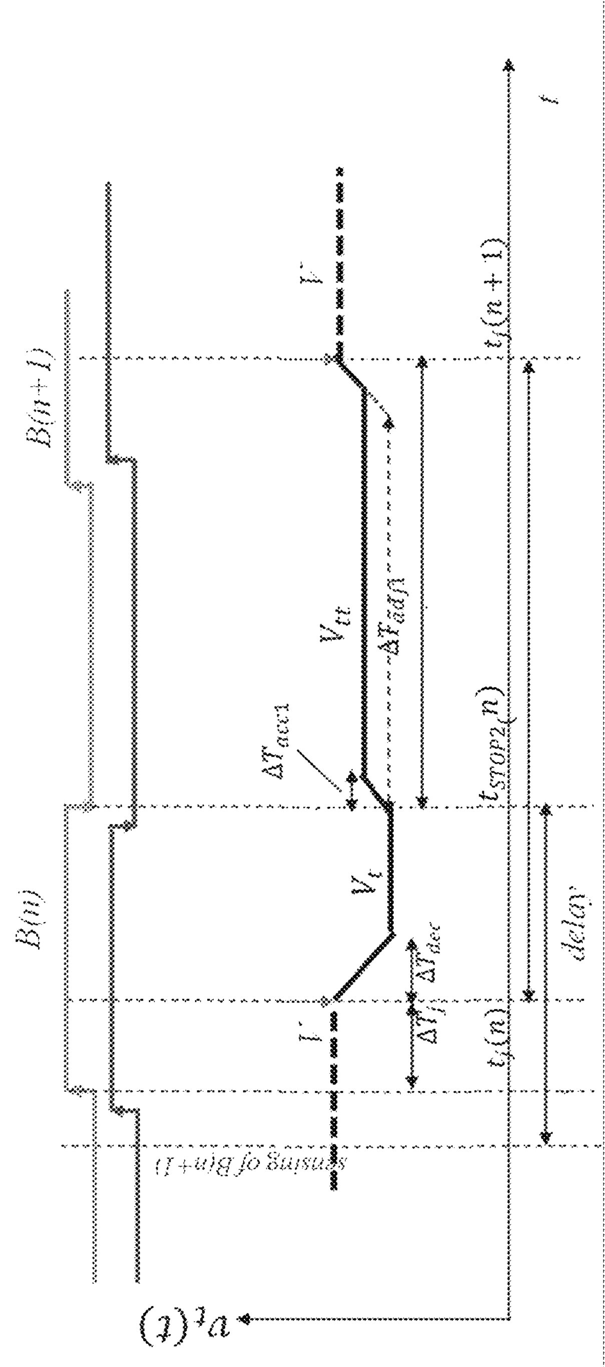
FIG. 15 shows a second exemplary case of a further adjustment of transport tape speed within the storing and issuing module according to the invention method.

In FIG. 15, a different case is represented, wherein in FIG. 10*b* $d_{pred}1<d_{pred}$ and during the initial adjustment of transport tape linear speed, the speed has been reduced. However, after the update of position provision of at least banknote B(n), it has been estimated that $d_{pred1}$ has now become smaller than $d_{pred}$ (for example because inside the storing and issuing module 10 banknote B(n) underwent a counter-rotation with respect to the longitudinal symmetry axis y-y) and therefore it is necessary to increase the speed of transport tape 170 with respect to what was previously determined at step F. This second adjustment of transport tape linear speed is performed according to an updated pattern comprising an initial part at constant acceleration $\Delta T_{acc1}$, a central part at constant speed $V_{tt}$ and a final part at constant acceleration $\Delta T_{acc1}$.

As for the first adjustment already discussed above, the formulas need to be obviously adjusted in case the entering banknote B(n) was the very first one of the series, based on parameters $\Delta T_{st}$, $\Delta T_j$ and $\Delta T_0$ already discussed above.

However, the skilled person will clearly understand that many other pattern for transport tape linear speed during both the first and optionally the second adjustment could be used for storage of the entering banknote B(n), without exceeding the scope of protection of the present invention, as long as at $t_j(n+1)$ when the next banknote B(n) in engaged with transport tape 170, the value of transport tape speed is the constant value V of the conventional pattern and the desired minimum distance $d_d$ between banknote B(n) and B(n+1) is left.

Going back to the invention method 1, in case position information for a next banknote B(n+1) transported on conveyor belt 20 toward the storing and issuing module 10 was obtained after the internal sensor unit 140 stops sensing that banknote B(n), and/or if the next banknote B(n+1) is not within a predetermined storage distance $d_{ST}$ from the storing and issuing module 10 when it is sensed before the internal sensor unit 140 stops sensing that banknote B(n), step G is provided, wherein linear speed $v_t(t)$ of transport tape 170 is brought to zero, over a transitional stop interval as will be better explained below.

In fact, it could happen that the next banknote B(n+1) is sensed so late for example by sensor group 30, during storage of banknote b(n) inside the storing and issuing module 10, that even if transport tape linear speed $v_t(t)$ was adjusted (reduced) in order to "wait" for its entrance into the storing and issuing module 10, transport tape 170 would still move too much toward storage roller 70 and the requirement of the desired distance $d_d$ between banknotes could not be met.

The transitional stop time interval above, according to a preferred embodiment of the invention could be a pre-set time interval. According to another preferred embodiment of the invention, the transitional stop time interval could be calculated based on position information of the entering banknote B(n), if no information on the next banknote B(n+1) were already available. In this case a minimum stop distance could be calculated, which should be covered during the transitional stop time interval, for example equal to:

$$d_{STOP} = \frac{H}{\cos(\alpha(n+1))} + d_d - d_{40-140} + -\Delta join(n)$$

under the assumption that the next banknote will have the same position information of B(n), where Δjoin(n) is the estimated distance covered by transport tape 170 from the time instant at which transport tape 170 starts moving and the time instant $t_j$(n+1) at which the next banknote B(n+1) is engaged with transport tape 170.

Transport tape 170 rests at least until (at step H) position information for the next banknote B(n+1) transported on conveyor belt 20 toward the storing and issuing module 10 is obtained or the next banknote B(n+1) that had been sent before the internal sensor unit 140 stopped sensing banknote B(n) moves within the predetermined storage distance $d_{ST}$ from the storing and issuing module 10, so that it is possible to store it inside the storing and issuing module 10 at the desired distance $d_d$ from banknote B(n+1).

When position information for the next banknote B(n+1) transported on conveyor belt 20 toward the storing and issuing module 10 is obtained and the next banknote B(n+1) is within the predetermined storage distance $d_{ST}$ from the storing and issuing module 10 or the next banknote B(n+1) that had been sensed before the internal sensor unit 140 stopped sensing banknote B(n) moves within the predetermined storage distance $d_{ST}$ from the storing and issuing module 10, after step H, invention method 1 comprises calculating at following step D2 an actual minimum distance $d_{pred}$, along an axis $y_{MIN}$-$y_{MIN}$ parallel to longitudinal symmetry axis y-y, that would be left between the rear side of the entering banknote B(n) and the front side of the next banknote B(n+1) on transport tape 170, if transport tape 170 moved according to the conventional pattern of transport tape linear speed $v_t$(t). In this case, according to the conventional pattern, transport tape speed $v_t$(t) is zero and would start increasing with constant acceleration according to the conventional pattern after the next banknote B(n+1) is sensed by the external sensor unit 40, as described above, or when it is sensed by the internal sensor unit 140.

Also in this case, as for step D described above, the actual minimum distance $d_{pred}$ between such banknotes is calculated based on dimension information and the last obtained position information on banknote B(n), the last obtained position information on the next banknote B(n+1) and known design parameters of the system.

After step D2, the invention method 1 comprises, at following step E2, comparing the actual minimum distance $d_{pred}$ calculated at step D2 with the desired minimum distance $d_d$ above and, (at step F2) if the actual minimum distance $d_{pred}$ is different from the desired minimum distance $d_d$, invention method 1 comprises adjusting linear speed $v_t$(t) of transport tape 170, by sending corresponding control signals through processor 150 and within the time instant tj(n+1) at which the next banknote B(n+1) is engaged with transport tape 170 inside the storing and issuing module, such that the desired minimum distance $d_d$ along said axis $y_{MIN}$-$y_{MIN}$ parallel to longitudinal symmetry axis y-y is left on transport tape 170 between the rear side of the entering banknote B(n) and the front side of the next banknote B(n+1).

In this case, the next banknote B(n+1) is considered as if it was the first banknote of the series (as described above) and, after step F2, the invention method 1 is moved back to step B.

Figure 16:
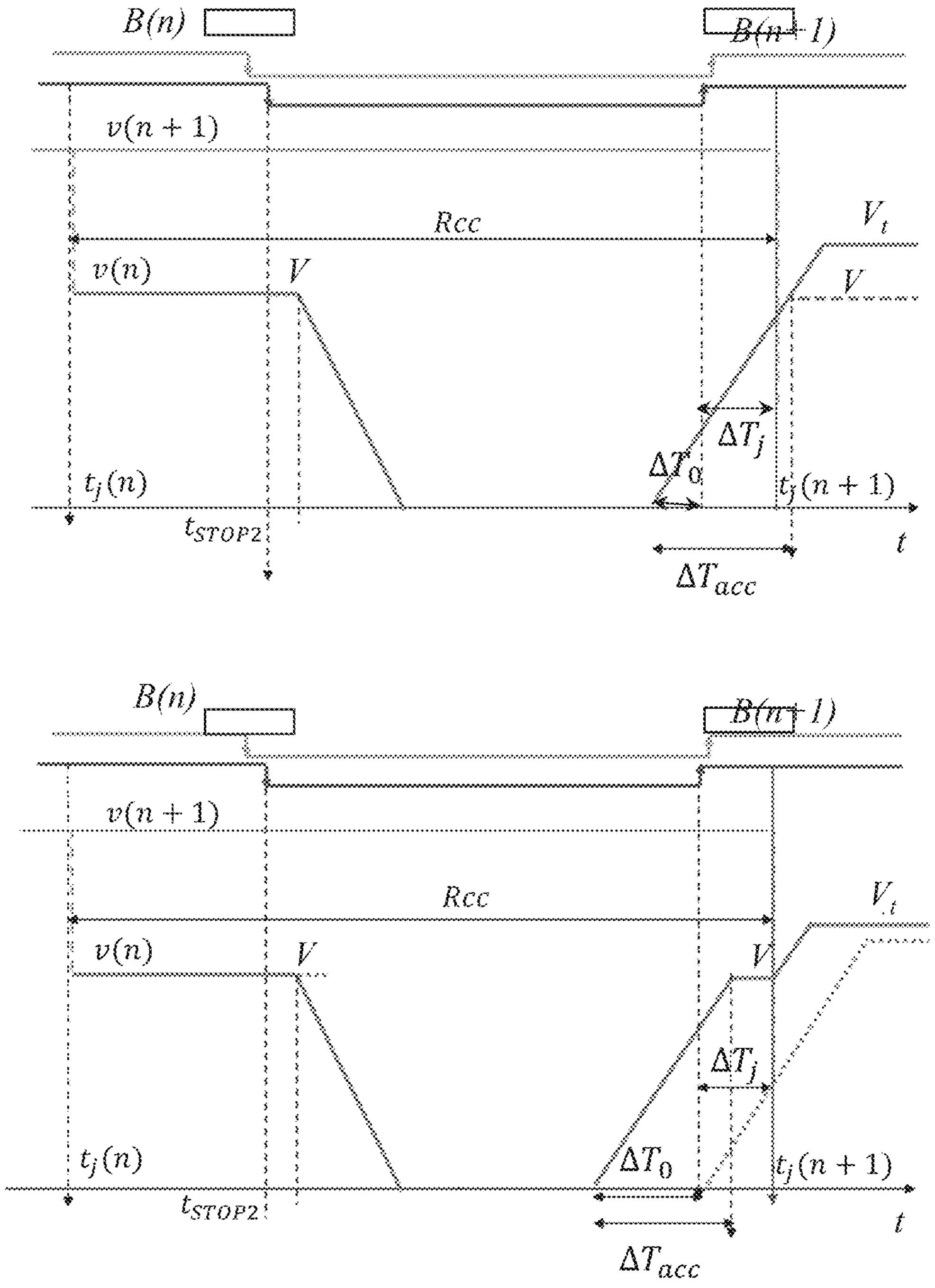
FIG. 16 is a graphical representation of the speed of transport tape, a first and a second banknote of a series of banknotes to be stored in the storing and issuing module, when the next banknote of the series is sensed in the system after the previous banknote inside the storing and issuing module is not sensed anymore by an internal sensor unit or when the next banknote is sensed before the banknote inside the storing and issuing module is not sensed anymore by the internal sensor unit, but it is at a distance greater than a storage distance $d_{ST}$ from the storage and issuing module.

As soon as the information about the next entering banknote B(n+1) is available, transport tape linear speed can be adjusted with respect to the conventional pattern as explained above, so that, when the next banknote B(n+1) is engaged with transport tape 170, the speed is equal to the constant value V of conventional pattern (FIG. 16, upper part).

In other circumstances, for example when too much time passes by between banknote B(n) and the next banknote B(n+1), the next banknote B(n+1) is considered the very first one of the series and will engage transport tape during the transitional start time interval thereof where speed is lower than V and varies at constant acceleration (FIG. 16, lower part).

In case the actual minimum distance $d_{pred}$ calculated at step D2 is equal to the desired minimum distance $d_d$ above, no adjustment of transport tape linear speed $v_t$(t) is implemented and the invention method 1 moves back to step B where the process is repeated when the internal sensor unit 140 starts sensing the next banknote inside the storing and issuing module 10.

In view of the above, it is clear that invention system 100 and method 1 overcome the drawbacks posed in the preamble of the present description. In fact, considering the last obtained position information on each entering banknote B(n) and the next one B(n+1) of the series allows to more accurately determine the actual actual minimum distance therebetween, and to better adjust speed $v_t$(t) of transport tape 170 so that, despite angular displacement of banknotes occurring along conveyor belt 20 or inside the storing and issuing module 10, an increased number of non-overlapping banknotes can be stored. The number of banknotes stored in a single storing and issuing module is increased and at the same time, the risk of jamming is reduced.

Further to that, since any adjustment of transport tape 170 speed $v_t$(t) is carried out independently between a banknote B(n) and the next banknote b(n+1) of the series, any series of banknotes wherein banknotes enter the system at the same nominal rate and having the same angular displacement is handled by invention method 1 and system 100 at constant transport tape 170 speed $v_t$(t), which is advantageous in terms of system management economy.

The preferred embodiments of this invention have been described and a number of variations have been suggested hereinbefore, but it should be understood that those skilled in the art can make other variations and changes without so departing from the scope of protection thereof, as defined by the attached claims.

For example, the skilled person would easily understand that even though the invention has been described for a system and method for storing banknotes having the same denomination, the present system and method can also be easily used for storing a series of banknote having different denominations. In this case, the formulas indicated above, should be adapted to consider as height parameter H, the height of the banknote between B(n) and the next one B(n+1) having the highest height.

Also, system 100 and method 1 of the invention can be implemented in devices other than receiving and dispensing ones. For example, they can be implemented only in receiving devices. Moreover, system 100 of the invention can comprise two or more storing and issuing modules 10, as represented, for example, in FIG. 2. In this case, through identification information ID, the central processing unit 50 can assign a banknote B(n) to a specific storing and issuing module 10 of the system and in this case, appropriate way of transporting the banknotes on conveyor belt 20 and diverting them to the corresponding storing and issuing module 10, will be comprised in the system.

As a final remark, it is to be noted that in the present description reference is made to a system 100 where the central processing unit 50 forwards dimension and position information obtained by sensor group 30 and the external sensor unit 40 to processor 150 of a storing and issuing module 10. However, if the system 100 according to the invention had only one storing and issuing module 10, dimension and position information provided by sensor group 30 and the external sensor unit 40 could be sent directly to processor 150 for calculation of the pattern of the linear speed of transport tape 70 as disclosed above.

The invention claimed is:

1. A method (1) for storing a series of flexible documents ( . . . , B(n−1), B(n), B(n+1), . . . ) in a system (100), each flexible document ( . . . , B(n−1), B(n), B(n+1), . . . ) having a front side and a rear side and the system (100) comprising said method (1) comprising:

A. activating using at least one sensor for sensing each flexible document ( . . . , B(n−1), B(n), B(n+1), . . . ) during transportation into a storing and issuing module (10) during storage operations, and providing corresponding dimension information and position information with respect to the longitudinal symmetry axis (y-y) to a central processing unit (50) or processor (150); and B. sensing a first flexible document B(n) by the at least one sensor inside the storing and issuing module (10), and C. sensing a next flexible document B(n+1) transported on a belt (20) toward the storing and issuing module (10) and determining corresponding position information for the next flexible document B(n+1) after the at least one sensor begins sensing a first flexible document B(n), D. based on dimension information and a last obtained position information on the flexible document B(n), dimension information and the last obtained position information on the next flexible document B(n+1), determining by the processor (50) a minimum distance ($d_{pred}$), along an axis ($y_{MIN}$-$y_{MIN}$) parallel to a longitudinal symmetry axis (y-y), that would be left on transport tape (170), between the rear side of flexible document B(n) and the front side of the next flexible document B(n+1) of the series, E. comparing by processor (50) the determined minimum distance ($d_{pred}$) with a predetermined minimum distance $d_d$, and F. in response to the determined minimum distance ($d_{pred}$) being different from the predetermined minimum distance $d_d$, adjusting a linear speed ($v_t$(t)) of the transport tape (170) between a time instant ($t_j$(n)) at which flexible document B(n) is engaged with transport tape (170) and a time instant $t_j$(n+1) at which the next flexible document B(n+1) is engaged with transport tape (170) inside the storing and issuing module (10).

2. The method according to claim 1, wherein said position information provided by a sensor group (30), an at least one external sensor unit (40) and an internal sensor unit (140) comprises at least the angular displacement α(n) of the sensed flexible document B(n), with respect to an axis parallel to the longitudinal symmetry axis (y-y) and the minimum linear distance (Y (n)) of the sensed flexible document B(n) from one lateral edge of said conveyor belt (20) or transport tape (170).

3. The method according to claim 1, wherein position information the next flexible document B(n+1) is provided by one between sensor group (30) and at least one external sensor unit (40), whichever sensed the next flexible document B(n+1) last, and position information for flexible document B(n) is provided by one between the sensor group (30), the at least one external sensor unit (40) and the internal sensor unit (140), whichever sensed the flexible document B(n) last.

4. The method according to claim 1, wherein said actual minimum distance ($d_{pred}$) is also a function of the time interval (Rcc) between the time instant $t_j$(n) at which the rear side of flexible document B(n) would engage with transport tape (170) and start moving therewith inside the storing and issuing module (10), and the time instant $t_j$(n+1) at which the rear side of the next flexible document B(n+1) would engage with transport tape (170) and start moving therewith inside the storing and issuing module, estimated based on the last available position information of flexible document B(n) and the next flexible document B(n+1).

5. The method according to claim 1, wherein said actual minimum distance ($d_{pred}$) is also a function of:

a value err (n) indicating how far away is a rear side of flexible document B(n) with respect to opening (110) of the storing and issuing device (10) when, at $t_j$(n), that flexible document is engaged with transport tape (170), along an axis ($y_{MIN}$-$y_{MIN}$) parallel to the longitudinal symmetry axis (y-y) where the distance between the entering flexible document B(n) and the next flexible document B(n+1) is the lowest; and a value err (n+1), calculated along the same axis ($y_{MIN}$-$y_{MIN}$) where err(n) is calculated, indicating how far away is a front side of flexible document B(n+1), with respect to opening (110) of the storing and issuing device (10), when that flexible document B(n+1) enters the storing and issuing module.

6. The method according to claim 1, wherein said speed ($v_t$(t)) of transport tape is adjusted according to an updated pattern defining over time a line segment or chain of line segments.

7. The method according to claim 6, wherein said updated pattern is based on:

an acceleration value (a);

the constant speed value (V) of the conventional pattern of transport tape linear speed ($v_t$(t)), at regime operational conditions;

the estimated rate value (Rcc);

the actual minimum distance ($d_{pred}$) and the desired minimum distance ($d_d$).

8. The method according to claim 1, wherein if position information for the next flexible document B(n+1) transported on conveyor belt (20) toward the storing and issuing module (10) is provided after an internal sensor unit (140) stops sensing said flexible document B(n), and/or if the next flexible document B(n+1) is not within a predetermined storage distance ($d_{ST}$) from the storing and issuing module (10), said method (1) comprises:

G. bringing linear speed ($v_t$(t)) of transport tape (170) to zero, and

H. keeping transport tape stopped at least until position information for the next flexible document B(n+1) transported on conveyor belt (20) toward the storing and issuing module (10) is obtained and the next flexible document B(n+1) is within the predetermined storage distance ($d_{ST}$) from the storing and issuing module (10) or the next flexible document B(n+1) that had been sensed before the internal sensor unit (140) stopped sensing flexible document B(n) moves within the predetermined storage distance ($d_{ST}$) from the storing and issuing module (10).

9. The method according to claim 8, wherein transitional stop time interval:

is a pre-set value; or is calculated based on position information of the entering flexible document B(n) and the next flexible document B(n+1); or is calculated based on position information of the entering flexible document B(n) only, if no information on the next flexible document B(n+1) is available.

10. The method according to claim 8 wherein, after position information for the next flexible document B(n+1) transported on conveyor belt (20) toward the storing and issuing module (10) is obtained or the next flexible document B(n+1) that had been sensed before the internal sensor unit (140) stopped sensing flexible document B(n) moves within the predetermined storage distance ($d_{ST}$) from the storing and issuing module (10):

D2. Calculating, based at least on dimension information and the last obtained position information on flexible document B(n), the last obtained position information on the next flexible document B(n+1) and known design parameters of the system (100), said actual minimum distance ($d_{pred}$), along an axis ($y_{MIN}$-$y_{MIN}$) parallel to longitudinal symmetry axis (y-y), that would be left between the rear side of said flexible document B(n) and the front side of the next flexible document B(n+1) on transport tape (170), if transport tape (170) moved according to said conventional pattern linear speed ($v_t(t)$), E2. comparing the actual minimum distance ($d_{pred}$) calculated at step D2 with the desired distance (da) and, F2. if the actual minimum distance ($d_{pred}$) is different from the desired minimum distance ($d_d$), adjusting, by sending corresponding control signals through processor (50), linear speed ($v_t(t)$) of transport tape (170) with respect to the conventional pattern, within the time instant tj(n+1) at which the next flexible document B(n+1) is engaged with transport tape (170) inside the storing and issuing module (10), such that the desired distance da along said axis ($y_{MIN}$-$y_{MIN}$) parallel to the longitudinal symmetry axis (y-y) is left on transport tape (170) between the rear side of the entering flexible document B(n) and the front side of the next flexible document B(n+1).

11. The method according to claim 8, comprising after step F:

I. determining, if updated position information at least on flexible document B(n) is provided to processor (50), when the flexible document B(n) has moved further inside the storing and issuing module (10) and the internal sensor unit (140) has stopped sensing it inside the storing and issuing module (10); and L. if so, repeating steps D to F with:

the last obtained position information of flexible document B(n);

the last obtained position information of the next flexible document B(n+1); and wherein:

transport tape (170) linear speed ($v_t(t)$) to be adjusted is the linear speed of transport tape (170) already adjusted at previous step F;

the actual minimum distance ($d_{pred1}$) to be estimated, is the one that would be left between the entering flexible document B(n) and the next one B(n+1) on transport tape (170) if transport tape (170) moved at said already adjusted linear speed ($v_t(t)$); and the actual minimum distance ($d_{pred1}$) so determined, is to be compared with the actual minimum distance ($d_{pred}$) estimated at previous step D.

12. A system (100) for storing a series of flexible documents ( . . . , B(n−1), B(n), B(n+1), . . . ), each flexible document ( . . . , B(n−1), B(n), B(n+1), . . . ) having a front side and a rear side, comprising:

at least one storing and issuing module (10), one conveyor belt (20) having a longitudinal symmetry axis (y-y) extending inside the storing and issuing module (10), the conveyor belt (20) being configured for supporting and transporting said flexible documents ( . . . , B(n−1), B(n), B(n+1), . . . ), into said at least one storing and issuing module (10) at known conveying speed ($v_e$), one sensor group (30), arranged with respect to said conveyor belt (20) in such a way that it can sense each flexible document ( . . . , B(n−1), B(n), B(n+1), . . . ) of the series entering the system (100) and being transported on said conveyor belt (20), and provide corresponding dimension information and position information on the sensed flexible document ( . . . , B(n−1), B(n), B(n+1), . . . ), with respect to said longitudinal symmetry axis (y-y);

at least one external sensor unit (40), arranged along said conveyor belt (20) between the sensor group (30) and the storing and issuing module (10), at a pre-set distance from the storing and issuing module (10) and configured for sensing the passage of each flexible document ( . . . , B(n−1), B(n), B(n+1), . . . ) of the series and providing at least position information thereof, with respect to said longitudinal symmetry axis (y-y);

and a central processing unit (50), operatively connected to said sensor group (30), said at least one external sensor unit (40) and said at least one storing and issuing module (10) and configured to receive, process and store at least said dimension information and position information, when it is provided by said sensor group (30) and said at least one external sensor unit (40), and send corresponding signals to said at least one storing and issuing module (10);

wherein in said at least one the storing and issuing module (10) one opening (110) is formed, through which each flexible document of the series can enter the same with its front side, and be transported through a linear conveying section (120) of the storing and issuing module (10), the storing and issuing module (10) having at least:

a storage roller (70) configured for being actuated by a motor;

one transport tape (170) configured to be dragged in rotation by the storage roller (70) around the same an internal sensor unit (140), arranged along the linear conveying section (120) at a pre-set distance from opening (110) and configured for sensing the passage of each flexible document of the series on the linear conveying section (120) and providing position information thereof, with respect to said longitudinal symmetry axis (y-y);

holding means (80, 80'), arranged at said conveying section (120), at a predefined distance from the internal sensor unit (140) and configured for engaging each flexible document of the series with the transport tape (170), when it has entered the storing and issuing module (10) through opening (110), the engagement occurring along a linear path of transport tape (170) where transport tape (170) can be moved at linear speed ($v_t(t)$) before being rolled on storage roller (70);

one processor (150), operatively connected, to said central processing unit (50), and also operatively connected at least to said storage roller (70), motor, holding means (80, 80'), and internal sensor unit (140) and configured to receive, process and store said signals transmitted by said central processing unit (50), at least said position information of each flexible document of the series sensed by the internal sensor unit (140), and send corresponding control signals to said storage roller (170), motor, and holding means (80, 80'), and internal sensor unit (140);

said system (100) being configured to execute the method (1) according to claim 1.

13. A non-transitory computer-readable medium having stored thereon the computer instructions that, when executed by a processor, executes the method according to claim 1.

14. The method according to claim 1, wherein the adjusting the linear speed ($v_t(t)$) of the transport tape is configured such that:

the predetermined minimum distance ($d_d$) along said axis ($y_{MIN}$-$y_{MIN}$) parallel to the longitudinal symmetry axis (y-y) is left on the transport tape (170) between the rear side of the first flexible document B(n) and the front side of the next flexible document B(n+1), and dclc when, at $t_i$(n+1), the next flexible document B(n+1) is engaged with transport tape (170), the linear speed value of transport tape (170) is a constant speed value (V) of a conventional pattern of transport tape linear speed ($v_t(t)$) at regime operational conditions.

* * * * *